United States Patent [19]
Saneyoshi

[11] Patent Number: 6,025,790
[45] Date of Patent: Feb. 15, 2000

[54] POSITION RECOGNIZING SYSTEM OF AUTONOMOUS RUNNING VEHICLE

[75] Inventor: Keiji Saneyoshi, Tokyo-To, Japan

[73] Assignee: Fuji Jukogyo Kabushiki Kaisha, Tokyo-To, Japan

[21] Appl. No.: 09/127,843

[22] Filed: Aug. 3, 1998

[30] Foreign Application Priority Data

Aug. 4, 1997 [JP] Japan .................................. 9-209319

[51] Int. Cl.[7] .................................................. G08B 21/00
[52] U.S. Cl. ........................ 340/946; 244/189; 244/190; 244/17.11; 348/117; 348/144
[58] Field of Search .................................. 340/937, 946; 244/189, 190, 17.11; 348/117, 144

[56] References Cited

U.S. PATENT DOCUMENTS

| | | | |
|---|---|---|---|
| 5,015,187 | 5/1991 | Lord | 434/33 |
| 5,035,382 | 7/1991 | Lissaman et al. | 244/190 |
| 5,581,250 | 12/1996 | Khvilivitzky | 340/961 |
| 5,604,534 | 2/1997 | Hedges et al. | 348/144 |
| 5,625,409 | 4/1997 | Rosier et al. | 348/117 |
| 5,712,678 | 1/1998 | Hofmann | 348/117 |
| 5,716,032 | 2/1998 | McIngvale | 244/185 |
| 5,894,323 | 4/1999 | Kain et al. | 348/116 |
| 5,904,724 | 5/1999 | Margolin | 701/120 |

Primary Examiner—Daniel J. Wu
Assistant Examiner—Toan Pham
Attorney, Agent, or Firm—Smith, Gambrell & Russell

[57] ABSTRACT

A camera assembly 10 images a distant landscape and a downward landscape every a predetermined period of time. A position recognizing unit 30 of a moving object (autonomous running vehicle) detects the movement of the moving object on the basis of the movement between the imaged pictures of the distant and downward landscapes, which are imaged at different imaging times. That is, the movements of the distant-view and down-view images are converted to the moving amounts in the actual space on the basis of the distance images thereof, respectively, and the component of rotational speed based on the movement of the distant-view image is removed from the component of velocity based on the movement of the down-view image to derive a pure component of translation speed. Then, the pure component of translation speed is converted to a component of translation viewed from the ranging starting point to be accumulated to derive a navigation locus in a three-dimensional space to recognize the moving-object's own position. Thus, it is possible to analyze the surrounding environment in a three-dimensional space to cause the analyzed surrounding environment to be reflected on a navigation information, so that it is possible to obtain a precise and minute navigation information.

25 Claims, 22 Drawing Sheets

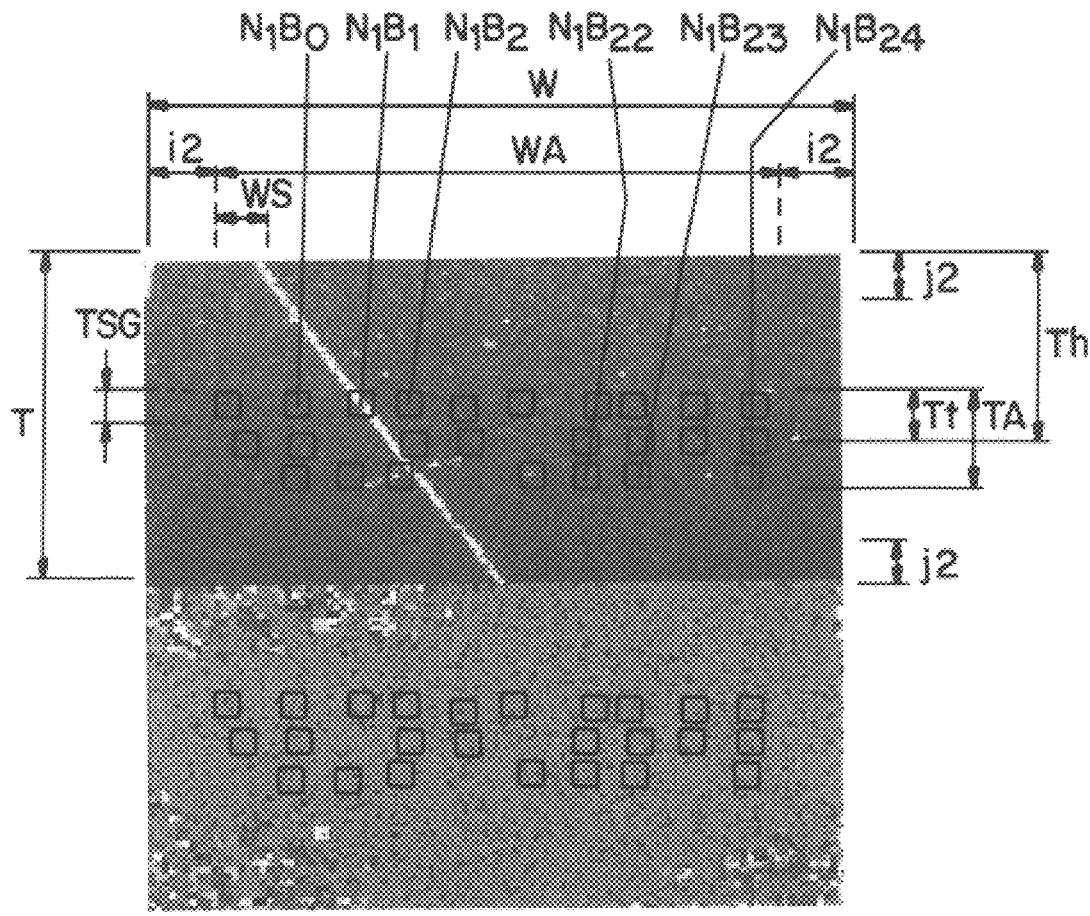
F I G. 15
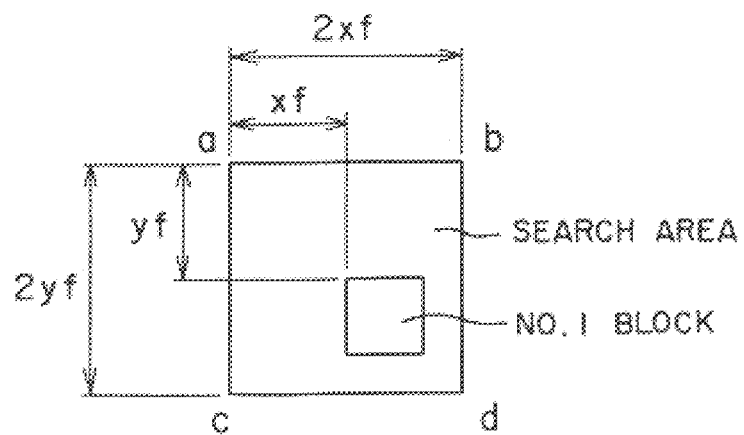
F I G. 16

POSITION RECOGNIZING SYSTEM OF AUTONOMOUS RUNNING VEHICLE

BACKGROUND OF THE INVENTION

1. Field of the Invention

The present invention relates generally to a position recognizing system for recognizing the three-dimensional position of a moving object, which moves by an autonomous navigation system.

2. Related Background Art

Conventionally, there have been developed various techniques, such as movement control, path detection, route detection and location detection, for a moving object, such as an unmanned robot, a self-contained traveling work (autonomous running) vehicle and an unmanned helicopter. Among these techniques, the moving object's own position recognizing technique is one of the important techniques.

As the moving-object's own position recognizing techniques, there is a technique for detecting a two-dimensional angular velocity of a moving object, such as an autonomous running vehicle, which autonomously travels on the ground, by a vibration gyro or an optical gyro and for detecting a translation speed of the moving object by a sensor for measuring a ground speed, to calculate a moving amount of the moving object from a reference position to measure the moving-object's own position. In the case of a flying object such as an unmanned helicopter, there is a technique for detecting a gravitational acceleration to detect the acceleration of the flying object and for integrating the acceleration to recognize the moving amount of the flying object by an inertial navigation system.

Moreover, in recent years, there is adopted a technique for receiving radio waves from at least three artificial satellites, such as satellites for a global positioning system, to analyze a phase difference between the radio waves received by two GPS receivers or to analyze code communication contents (the positions of the satellites and updating time of the radio wave emission) alone, estimating the moving object's own position. In Japanese Patent Application No. 8-249061, the applicant has proposed an autonomous running vehicle, which has an improved control stability by correcting the positioning data based on travel history from a reference position on the basis of the positioning data obtained by utilizing satellites.

However, in the case of a flying object such as an unmanned helicopter, it is not only required to recognize the flying-object's own rotational and translation speeds in a three-dimensional space, but it is also required to obtain an accurate terrain clearance and a minute navigation information when the flying object flies at a low altitude.

In such a case, according to conventional systems, it is not possible to obtain a sufficient precision under the influence of drift, which causes the deterioration of the positioning precision. In addition, it is difficult to obtain an accurate terrain clearance if the flying object flies above a complex terrain. That is, the prior art is insufficient to precisely analyze a surrounding environment in a three-dimensional space to cause the analyzed results to be reflected in the navigation information.

SUMMARY OF THE INVENTION

It is therefore an object of the present invention to eliminate the aforementioned problems and to provide a position recognizing system of an autonomous running vehicle, which can analyze a surrounding environment in a three-dimensional space to cause the analyzed results to be reflected in a navigation information to obtain a precise and minute navigation information.

In order to accomplish the aforementioned and other objects, according to one aspect of the present invention, a position recognizing system of an autonomous running vehicle comprises: imaging means for imaging a distant landscape and a downward landscape every a predetermined period of time by an imaging system mounted on the autonomous running vehicle; first capturing means for extracting a plurality of characteristic pattern regions serving as first blocks from a first frame of an imaged picture of each of the distant landscape and the downward landscape; second capturing means for searching a second frame of an imaged picture of each of the distant landscape and the downward landscape for regions serving as second blocks having a same pattern as that of the first blocks, the second frame being imaged at the next timing to the first frame; rotational processing means for deriving a component of rotational speed of the autonomus running vehicle between the first and second frames on the basis of a movement of the imaged picture of the distant landscape from the first blocks to the second blocks and on the basis of an elapsed time between the first and second frames; translation processing means for deriving a component of velocity of the autonomous running vehicle between the first and second frames on the basis of a movement of the imaged picture of the downward landscape from the first blocks to the second blocks and on the basis of an elapsed time between the first and second frames and for removing the component of rotational speed from the component of velocity to derive a component of translation speed of the autonomous running vehicle between the first and second frames; and navigation processing means for converting the component of translation speed between the first and second frames to a component of translation speed viewed from a ranging starting point and for accumulating the converted component of translation speed to derive a navigation locus in a three-dimensional space so as to accurately perform an autonomous navigation by processing a huge amount of image data at a fast speed without drifting.

In the position recognizing system of an autonomous running vehicle according to the present invention, a distant landscape and a downward landscape are imaged every a predetermined period of time. Then, a plurality of characteristic pattern regions serving as the first blocks are extracted from the imaged pictures of the distant and downward landscapes, and an imaged picture, which is imaged at the next timing, is searched for regions serving as the second blocks having the same pattern as that of the first blocks. Then, a component of rotational speed of the autonomous running vehicle between frames is derived on the basis of the movement of the imaged picture of the distant landscape from the first block to the second block and on the basis of an elapsed time between the frames. In addition, a component of velocity of the autonomous running vehicle between the frames is derived on the basis of the movement of the imaged picture of the downward landscape from the first block to the second block and on the basis of an elapsed time between the frames, and the component of rotational speed is removed from the component of velocity to derive a component of translation speed of the autonomous running vehicle between the frames. Then, the component of translation speed between the frames is converted to a component of translation speed viewed from a ranging starting point to accumulate the converted component of translation speed to derive a navigation locus in a three-dimensional space to recognize the position of the autonomous running vehicle. Therefore, according to the present invention, there are excellent advantages in that it is possible to achieve a precise autonomous navigation function having small drift and that it is possible to the surrounding environment analysis using images having a massive amount of information to be reflected on the navigation processing.

In this case, the absolute position of the autonomous running vehicle may be recognized by initializing the position of the ranging starting point by an information obtained by a positioning system or a known map information. The movement of the imaged picture can be derived as a moving amount in actual space coordinates, which are obtained by converting the imaging surface coordinates to actual distances on the basis of the distance images obtained by the stereo imaged pictures of the distant landscape and the downward landscape. In addition, the component of translation speed between the frames may be corrected by a component of rotational speed representative of the current attitude of the autonomous running vehicle viewed from the ranging starting point, to be converted to the component of translation speed viewed from the ranging starting point.

The component of rotational speed representative of the current attitude of the autonomous running vehicle viewed from the ranging starting point may be obtained by multiplying a matrix representative of the attitude of the autonomous running vehicle viewed from the ranging starting point until the last processing, by a matrix representative of a component of rotational speed between the frames at the current processing after a matrix representative of a component of rotational speed of the autonomous running vehicle at the ranging starting point is converted to a unit matrix to be initialized.

When the first blocks are extracted, a plurality of search areas obtained by diving the imaged picture into predetermined ranges may be set, and a maximum of one of the first blocks may be extracted every search area. Alternatively, when m first blocks are extracted, the imaging screen may be divided into n regions, and the number of the first blocks extracted in each of the n regions may be m/n at the maximum. Thus, it is possible to extract a characteristic pattern, wherein the extracted portions are dispersed on the whole screen without concentrating on a specific region on the imaging screen.

When the first blocks are extracted from the imaged picture of the downward landscape, a line offset from a center line of a screen by a predetermined amount in a traveling direction may be set as a search starting line, and the search starting line may be variable by the component of translation speed. Thus, it is possible to effectively utilize the imaging surface in accordance with forward and reverse speeds in view of the movement of the down-view image.

Moreover, when a second block is searched, a predetermined search area surrounding a first block may be set, and the search area may be searched for the second block, so that it is possible to correctly carry out the image matching from the limited region. The imaging surface coordinates of a new position of a first block on the next screen may be predicted on the basis of the last component of rotational speed or translation speed, and a predetermined search area surrounding the predicted imaging surface coordinates may be searched for the second block.

In addition, when predetermined pairs of first and second blocks are not able to be captured, the components of rotational and translation speeds derived by the last processing may be updated as components of rotational and translation speeds in the current processing. After a difference between an arrangement pattern of a plurality of first blocks and an arrangement pattern of a plurality of second blocks is examined to remove blocks having different arrangements, when predetermined pairs of first and second blocks are able to be obtained, the routine may go to a process for deriving a component of rotational speed of the autonomous running vehicle every frame, and when the predetermined pairs of first and second blocks are not able to be obtained, the component of rotational speed derived in the last processing may be updated as a component of rotational speed in the current processing. This difference between the arrangement patterns can be examined by a distance between frames and an area of a triangle formed by the respective blocks.

On the other hand, in a case where the distant-view image is used, when the first blocks are extracted from the imaged picture of the distant landscape, a small region, which has a small distance image value in a region corresponding to the distance image and which is sufficiently far from a ranging point, may be used as a proposed first block. When the first blocks are extracted from the imaged picture of the downward landscape, a small plane region, which has a small dispersion in distance image value in a region corresponding to the distance image, may be used as a proposed first block. Thus, it is possible to extract a characteristic pattern suitable for a navigation calculation.

When the first blocks are extracted by the distant-view image, a picture quality of an objective region may be evaluated by a histogram prepared using a distance image value of a corresponding region of the distance image. The histogram may be prepared by counting a frequency larger than or equal to a predetermined threshold by an extracting pixel. When the proportion of the total frequency of histogram values in a predetermined range to a distance image value recording the maximum histogram is higher than or equal to a predetermined proportion, it may be determined that the picture quality in an objective region is good.

In addition, when a second block is searched, a predetermined search area surrounding a first block may be set, and a region having a minimum city block distance between the predetermined search area and the first block may be used as a proposed second block. In particular, the imaging surface coordinates of a new position of the first block on the next screen may be predicted on the basis of the last component of rotational speed or translation speed, and a region having a minimum city block distance between a predetermined search area surrounding the predicted imaging surface coordinates and the first block may be used as a proposed second block.

Moreover, the stereo imaging system may comprise a distant landscape imaging stereo camera and a downward landscape imaging stereo camera, and the directions of the imaging surfaces of the stereo cameras may be perpendicular to each other. The distant landscape imaging stereo camera and the downward landscape imaging stereo camera may be arranged so that the reference cameras of the stereo cameras are adjacent to each other. Thus, the detection center of the rotational motion of the autonomous running vehicle can be substantially coincident with the detection center of the translation motion.

BRIEF DESCRIPTION OF THE DRAWINGS

Preferred embodiments of the present invention will become understood from the following detailed description referring to the accompanying drawings.

In the drawings:

FIG. 15 is a schematic diagram for explaining a pattern for capturing down-view No. 1 blocks;

FIG. 16 is a schematic diagram for explaining the setting of a search area;

DESCRIPTION OF THE PREFERRED EMBODIMENTS

Referring now to the accompanying drawings, the preferred embodiments of a position recognizing system of an autonomous running vehicle, according to the present invention, will be described below.

Figure 1:
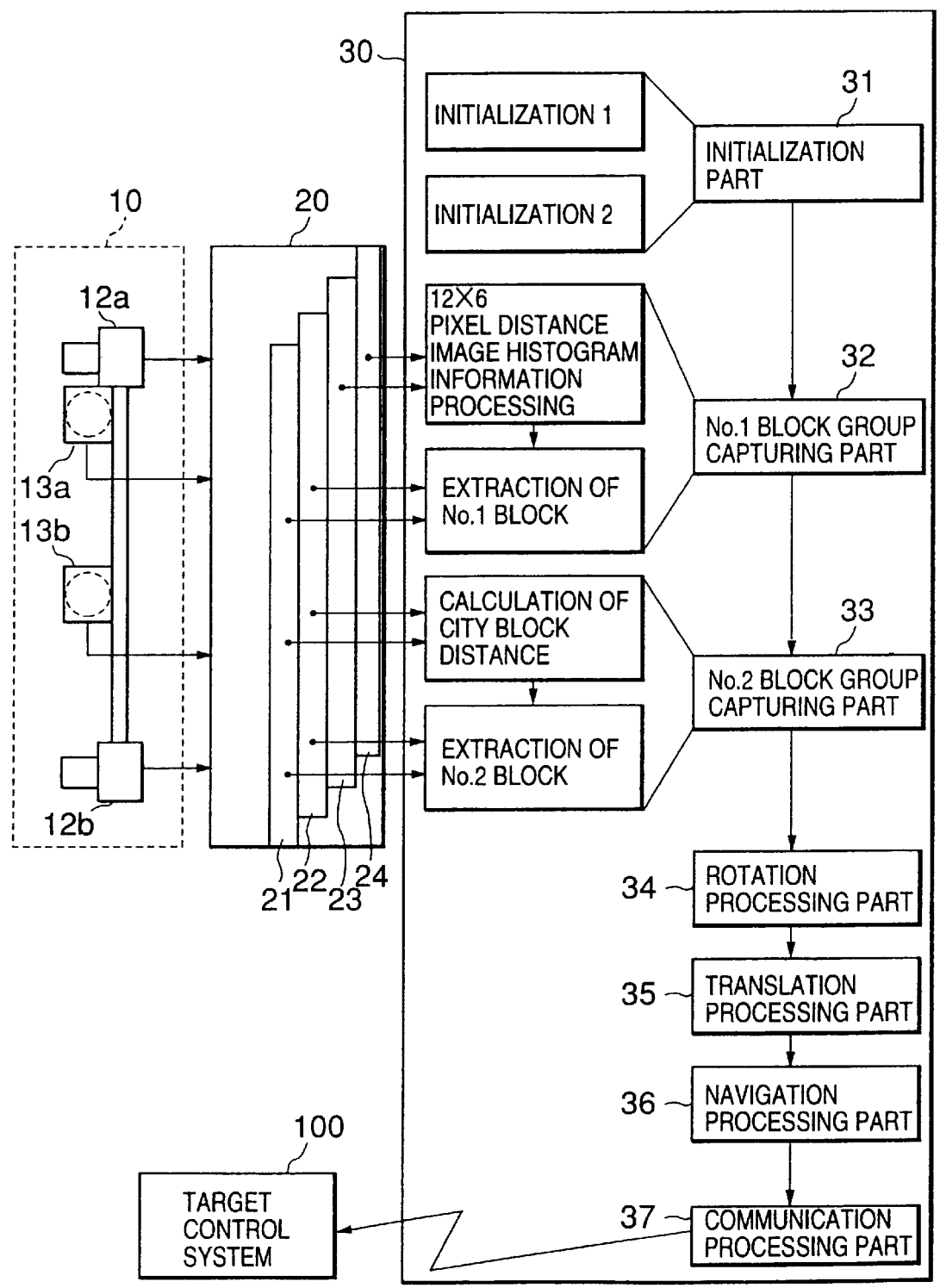
FIG. 1 is a functional block diagram of the preferred embodiment of a position recognizing system of an autonomous running vehicle according to the present invention.

FIG. 1 is a functional block diagram of the preferred embodiment of a position recognizing system of an autonomous running vehicle according to the present invention. The position recognizing system of a moving object, such as an autonomous running vehicle generally comprises: a camera assembly 10 including a plurality of cameras for measuring a three-dimensional space; a stereo image processing unit 20 for capturing a distance information from a picture imaged by the camera assembly 10; and a position recognizing unit 30 for recognizing the moving object's own position in the three-dimensional space on the basis of an image information to output a navigation data to an external target control system 100. The position recognizing system of an autonomous running vehicle in this preferred embodiment is applied to, e.g., an autonomous navigation system mounted on an unmanned helicopter for use in the spraying of agricultural chemicals or the like, and data processing is carried out by a parallel processing using a hand shake or a time schedule.

Figure 2:
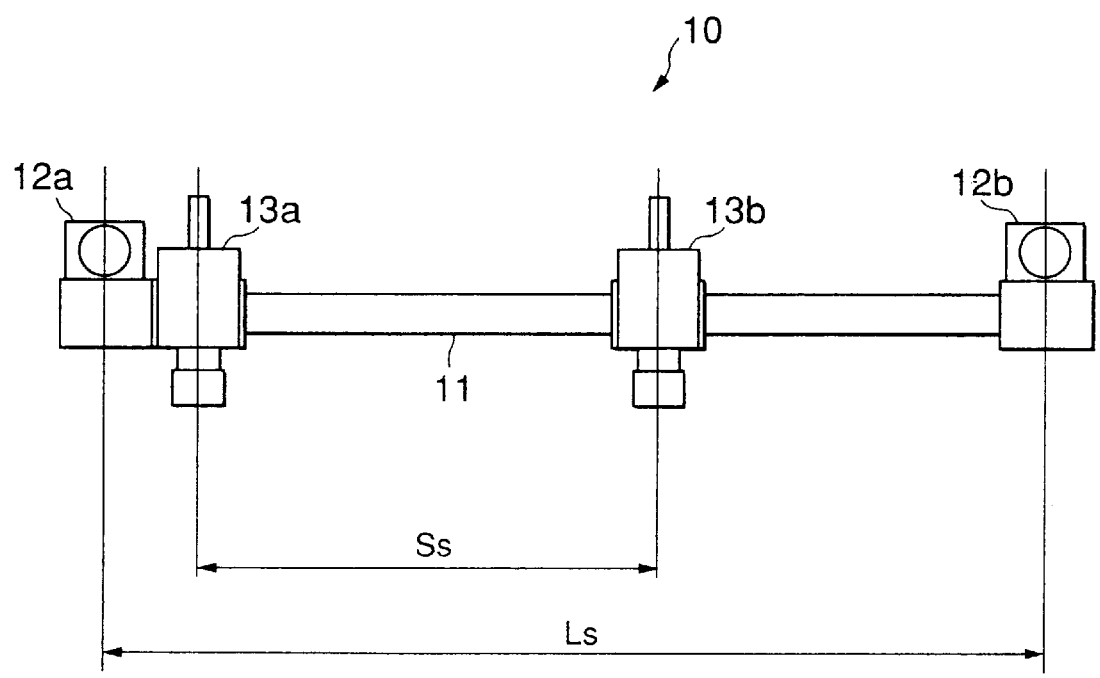
FIG. 2 is a schematic view of a camera assembly for measuring a three-dimensional space.

The camera assembly 10 serves as a ranging sensor, which is mounted on a moving object, for imaging a surrounding environment every a predetermined period of time to capture a variation in the surrounding environment every one screen and to capture a distance information in accordance with a horizontal displacement. As shown in FIG. 2, the camera assembly 10 comprises: a set of stereo cameras (each of which will be hereinafter referred to as a "distant-view stereo camera") 12a and 12b, provided on a frame 11, for imaging a distant landscape required to calculate a component of rotational speed of a moving object; and a set of stereo cameras (each of which will be hereinafter referred to as a "down-view stereo camera") 13a and 13b, provided on the frame 11, for imaging a downward landscape (the ground surface) required to calculate a component of translation speed of the moving object.

The distant-view stereo cameras 12a and 12b are arranged so as to establish a relationship of a base length Ls between a main camera (a reference camera) 12a and a sub-camera 12b having the same specifications as those of the main camera 12a and so as to allow the axes perpendicular to the imaging surfaces thereof to be parallel to each other. In addition, the down-view stereo cameras 13a and 13b are arranged so as to establish a relationship of a base length Ss between a main camera (a reference camera) 13a and a sub-camera 13b having the same specifications as those of the main camera 13a and so as to allow the axes perpendicular to the imaging surfaces thereof to be parallel to each other.

Figure 23:
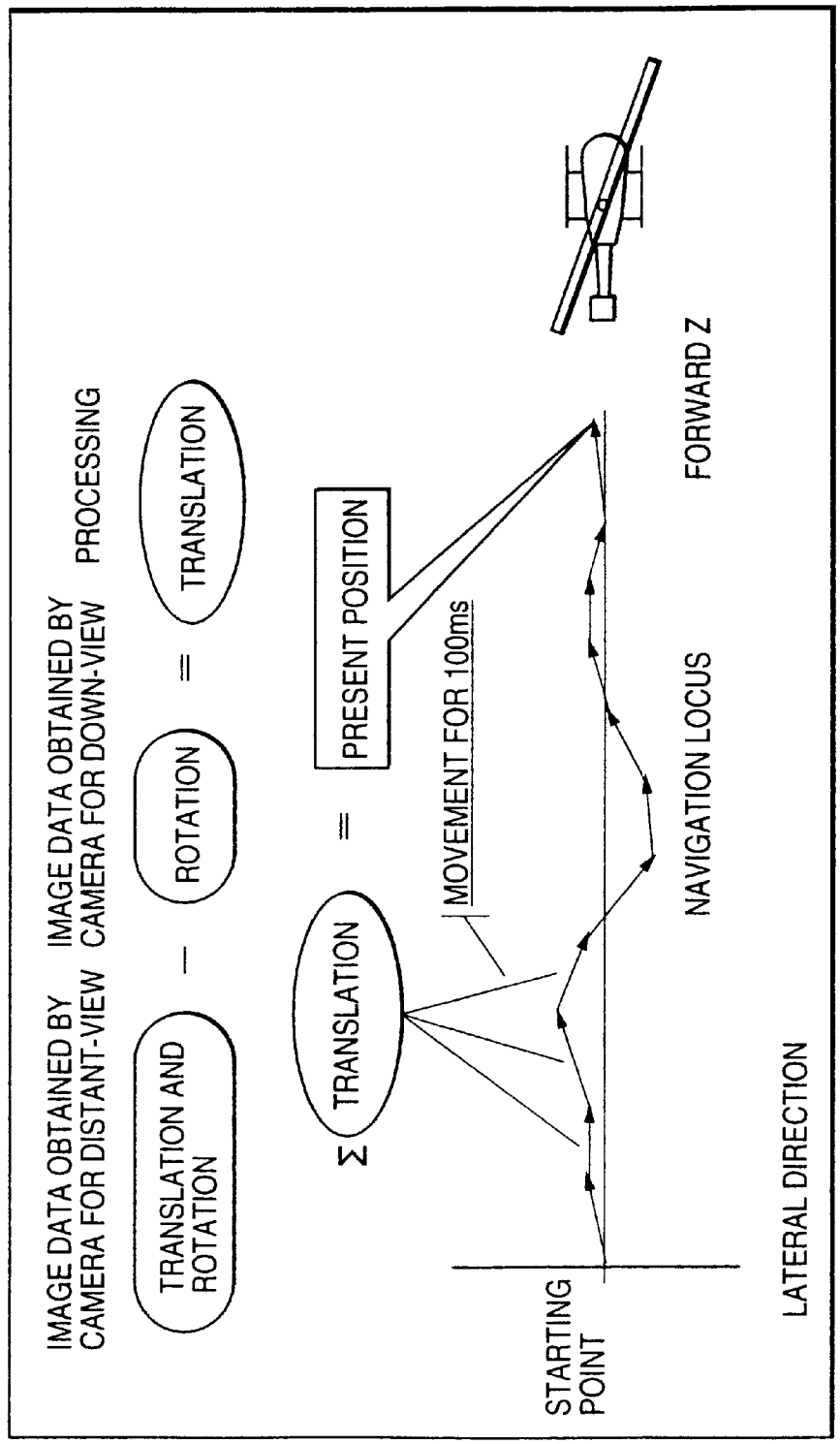
FIG. 23 is a schematic diagram for explaining a navigation locus based on an autonomous navigation.

In the position recognizing system of an autonomous running vehicle according to the present invention, the motion of a moving object is detected on the basis of the movement between pictures imaged at different imaging times with respect to each of an imaged picture of a distant landscape and an imaged picture of a downward landscape. The movements of the distant-view and down-view images are converted to moving amounts in an actual space on the basis of the respective distance images, respectively. Then, as shown in FIG. 23, a component of rotational speed based on the movement of the distant-view image is removed from the component of velocity based on the movement of the down-view image to derive a pure component of translation speed. Thereafter, the pure component of the translation speed is converted to a component of translation speed viewed from a ranging starting point (a starting point) to be accumulated, so that a navigation locus in the three-dimensional space is derived to recognize the moving object's own position.

In this case, in order to detect the rotational speed of the moving object by the distant-view stereo cameras 12a and 12b and in order to detect the rotational and translation speeds of the moving object by the down-view stereo cameras 13a and 13b, the axes perpendicular to the imaging surfaces of the distant-view stereo cameras 12a and 12b should be ideally perpendicular to the axes perpendicular to the imaging surfaces of the down-view stereo cameras 13a and 13b, and the reference points of the axes of the distant-view main camera 12a and the down-view main camera 13a should be ideally arranged at the same point on the same plane.

However, the reference points of the two main cameras 12a and 13a are actually difficult to be arranged at the same point. Therefore, according to the present invention, the axes perpendicular to the imaging surfaces of the distant-view stereo cameras 12a and 12b are arranged so as to be perpendicular to the axes perpendicular to the imaging surfaces of the down-view stereo cameras 13a and 13b. In addition, the distant-view main camera 12a and the down-view main camera 13a are adjacent to each other, and the three axes of one of the cameras are arranged in parallel to any one of the three axes of the other camera. Thus, the movements of the distant-view and down-view images obtained by the two sets of stereo cameras 12a, 12b and 13a, 13b can be treated by a single system of actual space coordinates.

In this case, the center of the three axes is positioned at the down-view stereo cameras 13a and 13b. However, even if the distant-view stereo cameras 12a and 12b rotate about the down-view stereo cameras 13a and 13b to cause an offset therebetween, such an offset has no influence on the movement of the distant-view image due to the characteristics of the distant-view image. In addition, since the axes of the down-view cameras and the distant-view cameras are perpendicular to each other, it is possible to simplify the processing for removing the component of rotational speed from the components of velocity containing translation and rotation, and the navigation calculation viewed from the origin (the origin of a system of XYZ coordinates fixed in a space at the ranging starting point), to accurately recognize the movement of the image.

Furthermore, the cameras used for the camera assembly 10 may include: a black-and-white camera based on Electronics Industries Association (EIA); cameras of a system for carrying out an area scan, such as a color CCD camera (also including a 3-CCD system), an infrared camera and a night vision camera; and cameras of a system for digitally outputting information from an imaging element.

The stereo image processing unit 20 mainly searches the imaging coordinates of the sub-camera 12b (or 13b) for a region having the same pattern as the imaging region of the main camera 12a (or 13a) to derive a displacement (=parallax) of images caused in accordance with the distance between the imaging element and the object to acquire a three-dimensional image information serving as numerical data of a perspective information to the object obtained by the displacement amount (the stereo image processing). The stereo image processing unit 20 has memories for recording the processed results every information content, such as a distant-view original image memory 21, a down-view original image memory 22, a distant-view distance image memory 23 and a down-view distance image memory 24.

The distant-view original image memory 21 records therein, in time series, the numerical image data obtained by AD-converting and LOG-converting the picture imaged by the distant-view main camera 12a. The down-view original image memory 22 records therein, in time series, numerical image data obtained by AD-converting and LOG-converting the picture imaged by the down-view main camera 13a.

The distant-view distance image memory 23 carries out the stereo image processing of two images obtained by the distant-view stereo cameras 12a and 12b, and records therein, in time series, the numerical data of the distance value to the imaging area or the object, which are imaged by the main camera 12a. Similarly, the down-view distance image memory 24 carries out the stereo image processing of two images obtained by the down-view stereo cameras 13a and 13b, and records therein, in time series, the numerical data of the distance value to the imaging area or the object, which are imaged by the main camera 13a.

Furthermore, the stereo image processing is described in detail in Japanese Patent Laid-Open No. 5-11409 for a patent application filed by the applicant of the present invention.

The position recognizing unit 30 extracts a plurality of portions having the same pattern with respect to the distant-view and down-view pictures imaged every a predetermined period of time to derive components of rotational and translation speeds on the basis of the movement of the respective images and the elapsed time every screen to convert the component of translation speed between frames to a component of translation speed viewed from the origin (the origin of a system of XYZ coordinates fixed in a space at the ranging starting point) to accumulate the converted component of translation speed in a three-dimensional space to recognize the moving-object's own position in real time.

As shown in FIG. 1, the position recognizing unit 30 comprises an initialization part 31, a No. 1 block group capturing part 32, a No. 2 block group capturing part 33, a rotation processing part 34, a translation processing part 35, a navigation calculating part 36, and a communication processing part 37.

The initialization part 31 initializes the hardware, constant values, and variable values, and stores therein the initial data of No. 1 and No. 2 block groups which will be described later.

The No. 1 block group capturing part 32 clips pattern portions (each of which will be hereinafter referred to as a "No. 1 block") of an image region suitable for the navigation processing from each of the distant-view and down-view original images at regular intervals, and captures a plurality of No. 1 blocks (a No. 1 block group) with respect to each of the distant-view and down-view images.

In this case, the No. 1 block is a reasonably small region so that a subsequent No. 2 block can correctly match with each of the No. 1 blocks only by translating even if the image rotates slightly and so that the distance to the ranging point from a massive amount of information can be correctly determined. In this preferred embodiment, the No. 1 block is a small region having a size of 12×6 pixels.

In order to capture the No. 1 block group, a histogram of distance image values appearing in the region of 12×6 pixels is prepared to evaluate the reliability of the imaged picture on the basis of the histogram information to determine the quality of the cut-out portion. That is, if the image patterns captured by the right and left cameras are the same, a distance image value corresponding to the displacement amount in the scanning direction can be obtained. By utilizing these characteristics, it is determined that the object image is a real certain image if there is a predetermined number of the same distance image values. Furthermore, the distance image and the distance image value will be described in detail later.

The No. 2 block group capturing part 33 sets a search area for searching the same portion as the pattern of the No. 1 block with respect to the picture imaged after a predetermined period of time, to calculate a city block distance every search area to determine the matching condition to extract the same portion (which will be hereinafter referred to as a "No. 2 block") as the pattern of the No. 1 block. This processing is carried out with respect to each of the distant-view and down-view images to capture a plurality of No. 2 blocks (a No. 2 block group). Furthermore, the city block distance will be described in detail later.

The rotation processing part 34 derives a difference between actual distance components on the basis of an optical flow (a distribution of moving vectors showing the movement on the imaging coordinate surface from the initial coordinates of the No. 1 block to the specific coordinates of the No. 2 block) from the No. 1 block group to the No. 2 block group of the distant-view image (the distant-view original image), to calculate the components of rotational speed (the angular velocities of roll, pitch and yaw) on the basis of the difference between actual distance components.

The translation processing part 35 derives a difference between actual distance components on the basis of an optical flow from the No. 1 block group to the No. 2 block group of the down-view image (the down-view original image) to remove the component of rotational speed from the component of velocity based on the difference between actual distance components to derive pure translation speeds in three-dimensional directions (X, Y, Z directions).

The navigation calculating part 36 converts the result calculated by the translation processing part 35 to the speeds in three-dimensional directions viewed from the origin, to accumulate the components of velocity from the initial point to derive the moving amount from the origin and the present position. The communication processing part 37 outputs a navigation data to the external target control system 100 by a parallel or serial communication.

With respect to the above time series algorithm, it is actually required to simultaneously capture the distant-view and down-view images. In view of serviceability as a navigation for an unmanned moving system, it is desired to transmit the navigation data to the external system in a short period (e.g., every 0.1 sec).

Figure 3:
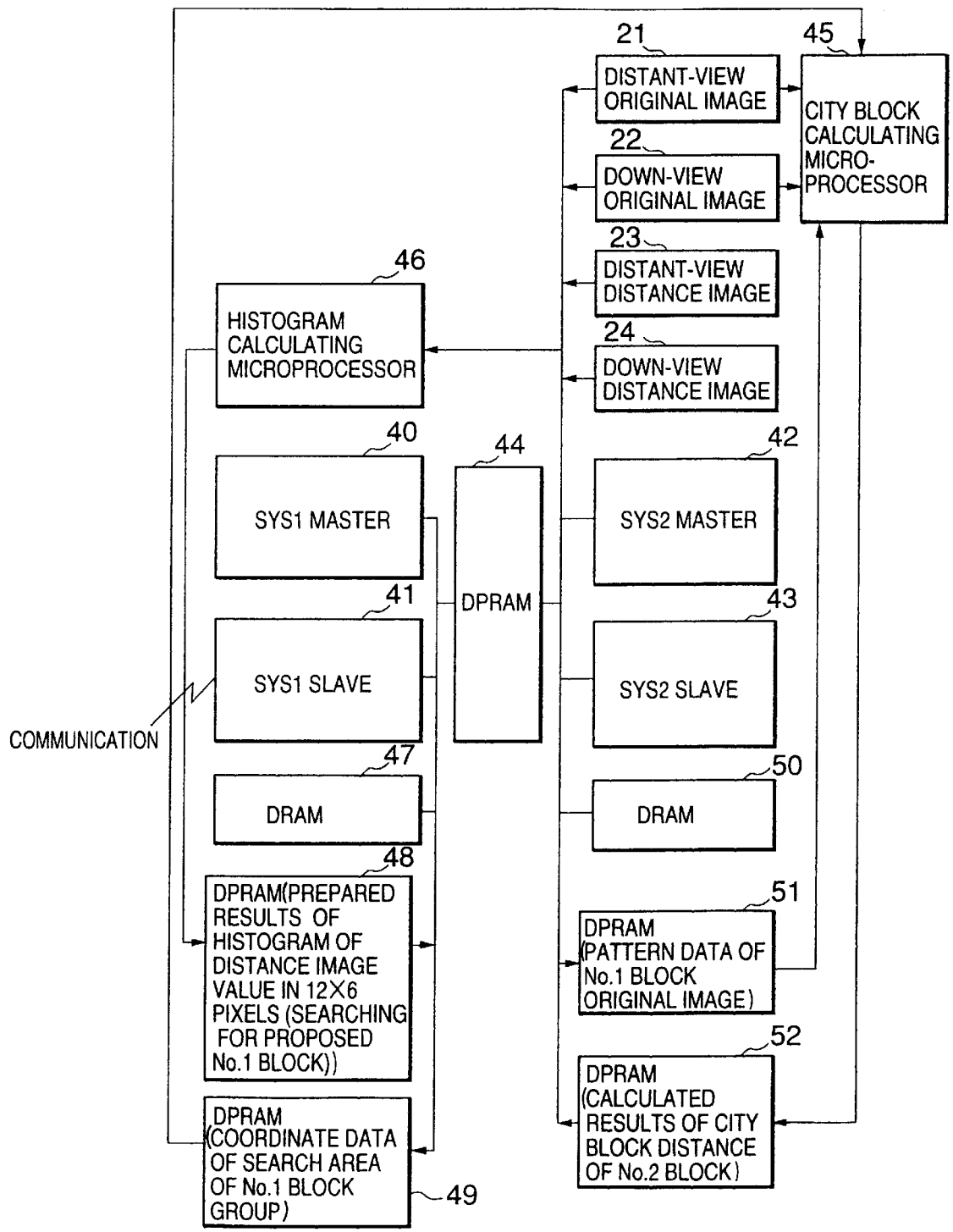
FIG. 3 is a circuit block diagram of the preferred embodiment of a position recognizing system of an autonomous running vehicle according to the present invention.

Therefore, the position recognizing unit 30 specifically has a hardware construction shown in FIG. 3, which realizes a high-speed processing based on the parallel processing.

That is, the position recognizing unit 30 basically comprises: a master processor (SYS1 master) 40 for capturing the No. 1 block group and a slave processor (SYS1 slave) 41 for processing communication, the master and slave processors 40 and 41 having the master slave relationship therebetween; a master processor (SYS2 master) 42 for capturing the No. 2 block group and a slave processor (SYS2 slave) 43 for calculating rotation, translation and navigation, the master and slave processors 42 and 43 having the master slave relationship therebetween and being connected to the master and slave processors 40 and 41 via a dual port RAM (DPRAM) 44; a microprocessor 45 for calculating a city block; and a microprocessor 46 for calculating a histogram.

To the buses on the side of the SYS1 master 40, a DRAM 47 for serving as a work area and recording a processing history, a DPRAM 48 for recording the prepared results of the histogram of the distance image value in a region of 12×6 pixels, a DRAM 49 for recording the coordinate data of the search area of the No. 1 block group are connected.

To the buses on the SYS2 master 42, a DRAM 50 for serving as a work area and recording a processing history, a DPRAM 51 for recording a pattern data of the No. 1 block original image, a DRAM 52 for recording the calculated results of the city block distance of the No. 2 block, and memories 21 through 24 of the stereo image processing unit 20 are connected.

Data from the distant-view distance image memory 23 and the down-view distance image memory 24 are inputted to the histogram calculating microprocessor 46, and the processed results are recorded in the DPRAM 48. Data from the distant-view original image memory 21, the down-view original image memory 22 and the DPRAMs 49 and 51 are inputted to the city block calculating microprocessor 45, and the processed results are recorded in the DPRAM 52.

Furthermore, in FIG. 3, the flows of a one-way data are shown by arrows, and the flows of a two-way data are shown by lines having no arrows.

Figure 4:
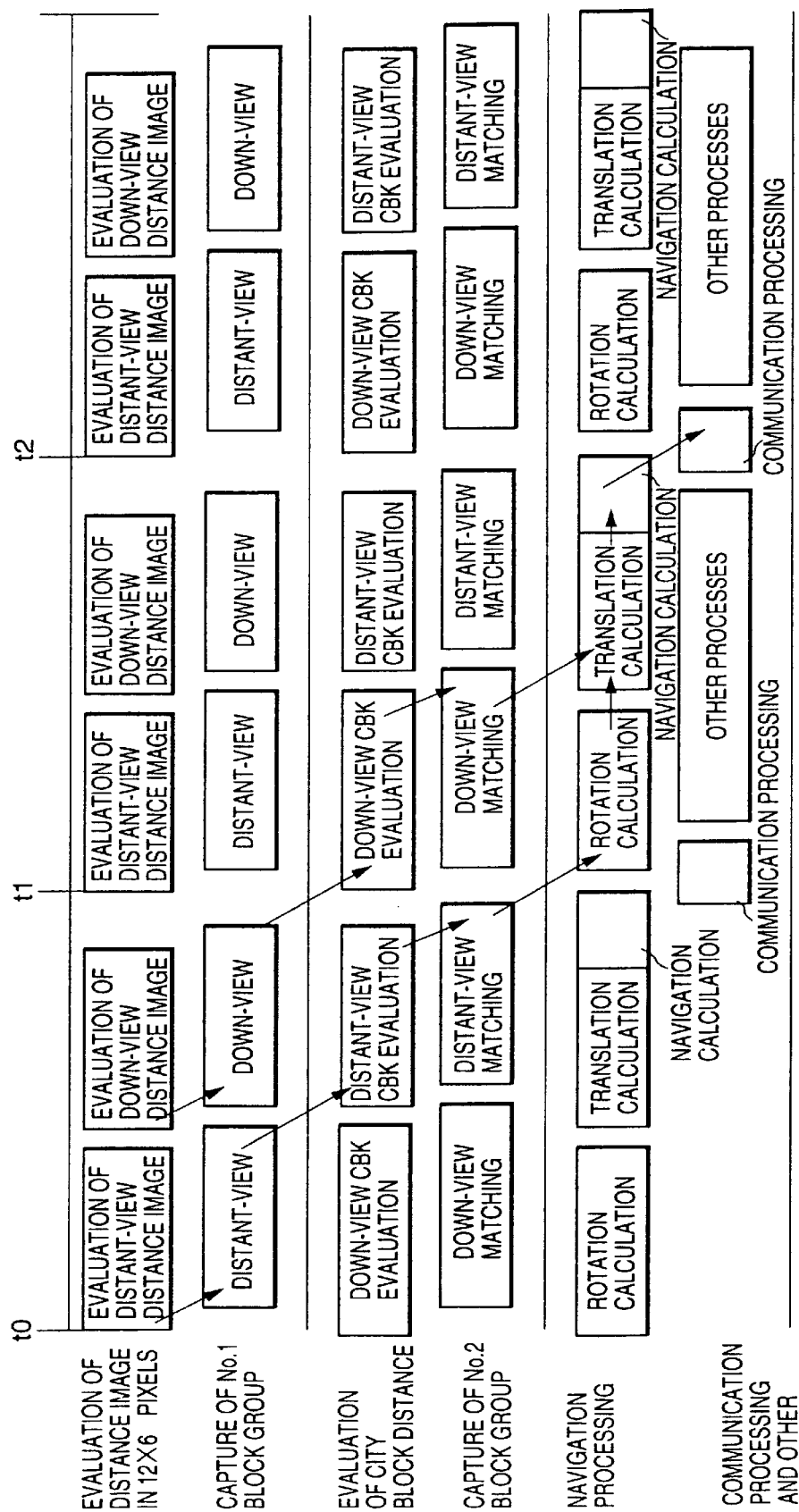
FIG. 4 is a time chart of a parallel processing.

With this hardware construction, the flow of processing will be briefly described. As shown in FIG. 4, with respect to the pictures imaged by the distant-view stereo camera 12, the capture of the No. 1 block group is carried out after the distance image evaluation of 12×6 pixels. After this processing is completed, with respect to the picture imaged by the down-view stereo camera 13, the capture of the No. 1 block group is started after the distance image evaluation of 12×6 pixels.

Simultaneously, with respect to the distant-view image, the matching processing of the No. 2 block group based on the city block distance (CBK) evaluation is started. After the distant-view matching processing is completed and when the navigation processing is started, with respect to the down-view image, the matching processing of the No. 2 block group is started after the CBK evaluation.

In the navigation processing, the navigation calculation for deriving a navigation locus is carried out after calculating the rotational speed and the translation speed. After the navigation data are calculated, the data are transmitted to the external system by the communication processing. Then, on the basis of the moving-object's own position obtained by the navigation data, the terrain clearance and flying direction of the helicopter are precisely controlled so that the helicopter takes a route in a preset absolute coordinate or a route set to a target on the ground.

Referring to the flowcharts of FIGS. 5 through 11, the moving-object's own position recognizing processing executed mainly in the position recognizing unit 30 will be described below.

Figure 5:
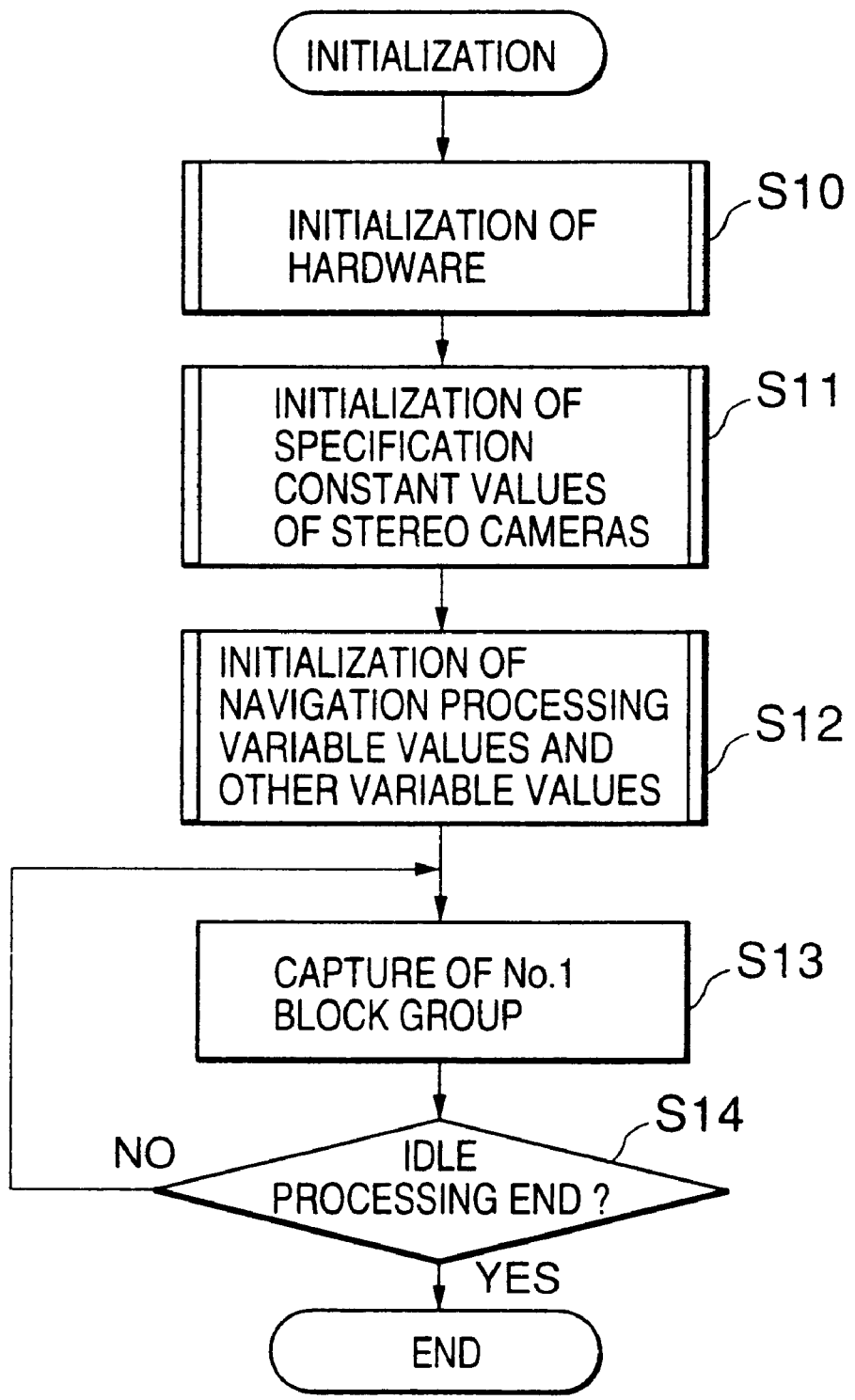
FIG. 5 is a flowchart of an SYS1 initializing routine.
Figure 6:
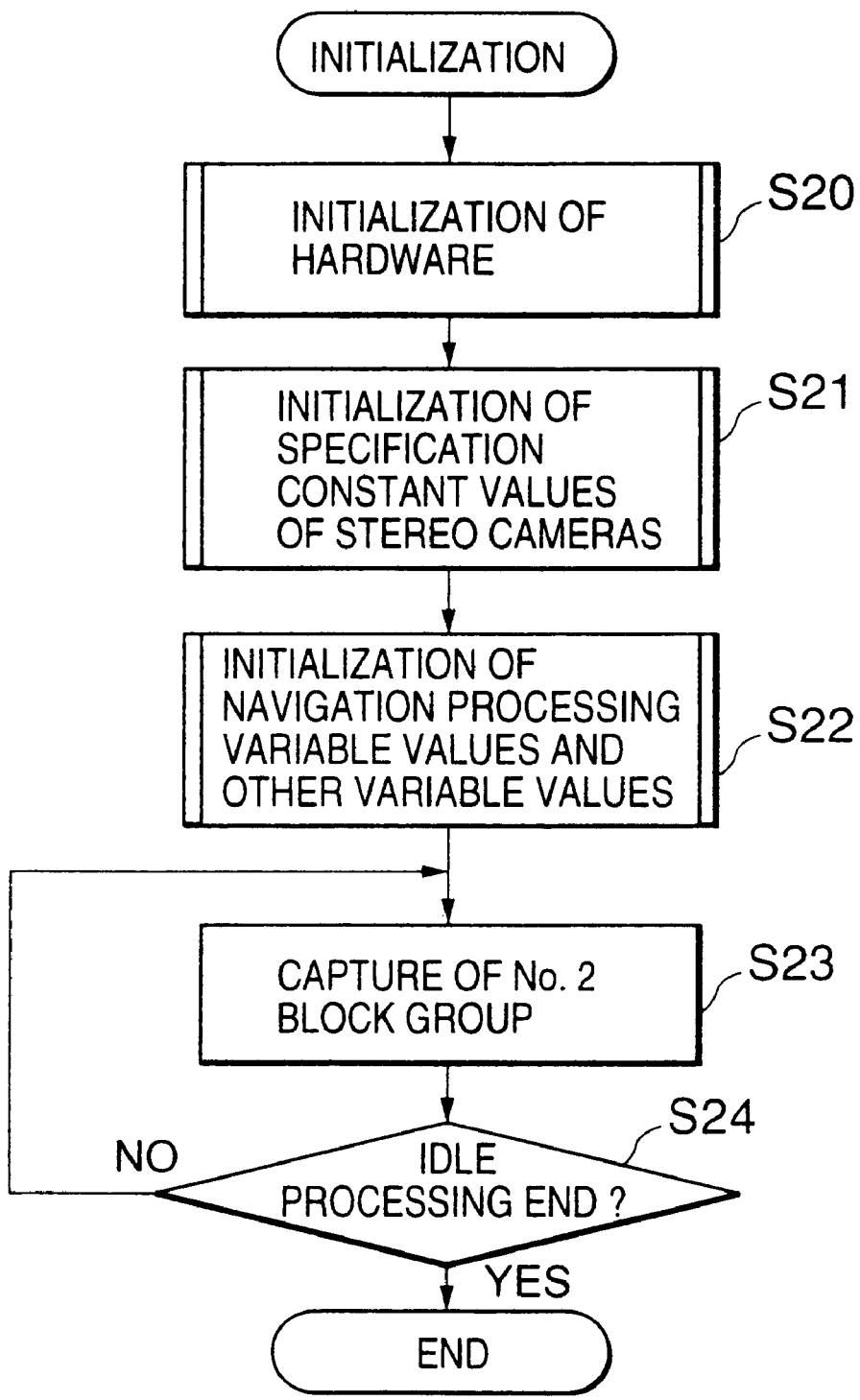
FIG. 6 is a flowchart of an SYS2 initializing routine.

FIG. 5 shows an SYS1 initializing routine in the SYS1 master 40, and FIG. 6 shows an SYS2 initializing routine in the SYS2 master 42. When the system is started, the SYS1 initializing routine on the SYS1 master 40 for capturing the No. 1 block group is first executed.

In the SYS1 initializing routine of FIG. 5, the respective portions of the hardware on the side of the SYS1 are initialized at step S10, and the specification constant values of the stereo cameras are initialized at step S11. Then, at step S12, the navigation processing variable values and other variable values are initialized. Then, the routine goes to step S13, wherein the capture of the No. 1 block group is executed as an idle processing. When one No. 1 block is captured, the routine goes to step S14, wherein it is determined whether the idle processing ends.

When it is determined that the idle processing does not end, the routine returns from step S14 to step S13, wherein the capturing of the No. 1 block is continued. When it is determined that the idle processing ends, the SYS1 initializing routine ends. This idle processing is a processing for storing the data of the No. 1 block in buffers when the navigation processing is started. For example, three buffers are provided, the loop including steps S13 and S14 is repeated three times.

When the No. 1 block is captured in the above SYS1 initializing routine, the SYS2 initializing routine of FIG. 6 is started. Then, the respective portions of the hardware on the side of the SYS2 are initialized at step S20, and the specification constant values of the stereo cameras are initialized at step S21. Then, the navigation processing variable values and other variable values are initialized.

Then, the capture of the No. 2 block group is carried out at step S23, and it is determined at step S24 whether the idle processing ends. After the processing loop including steps S23 and S24 is repeated a predetermined number of times, the SYS2 initializing routine ends.

Figure 7:
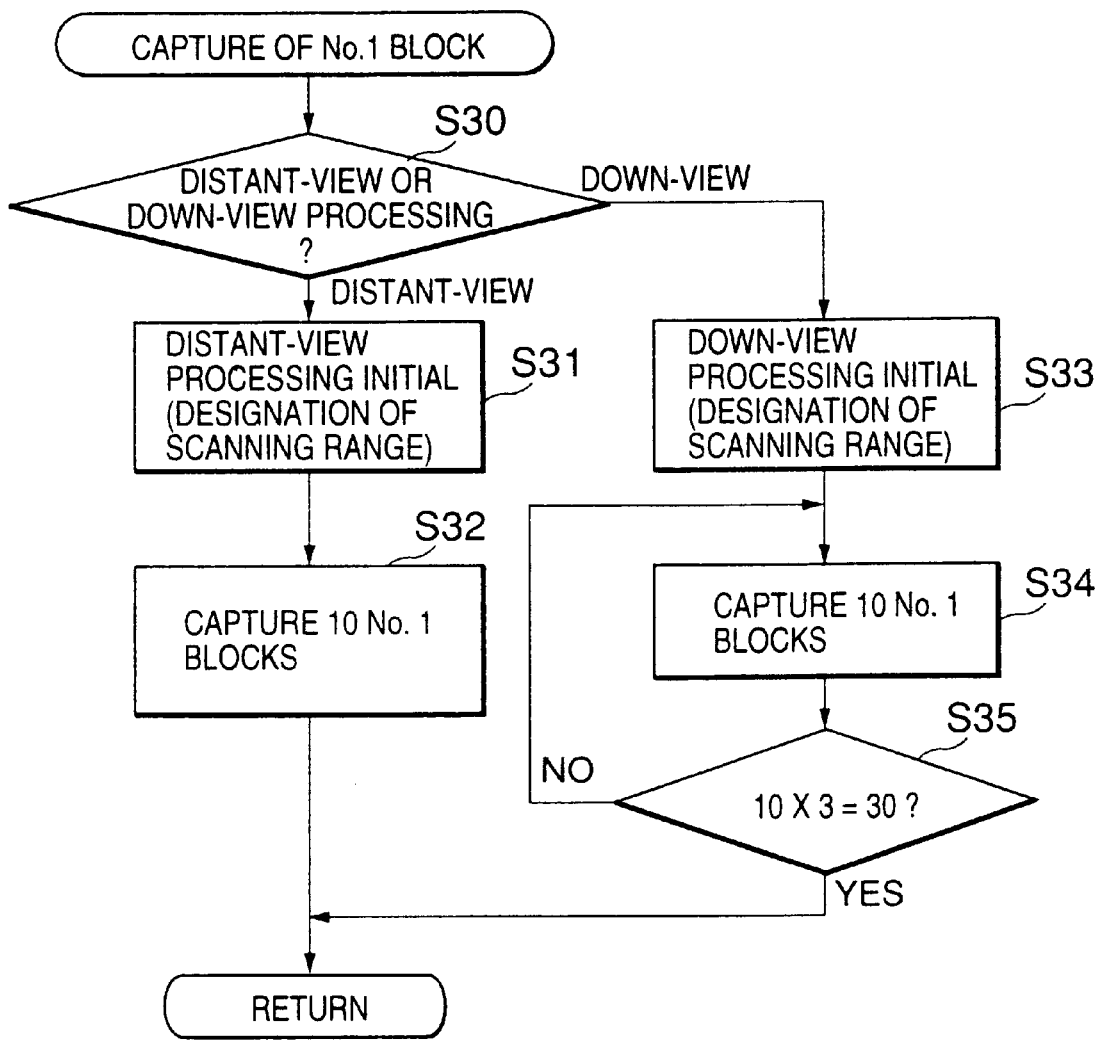
FIG. 7 is a flowchart of a processing routine for capturing No. 1 block group.

Referring now to FIG. 7, the capture of the No. 1 block group will be described below. In this processing, it is first determined at step S30 whether the distant-view processing or the down-view processing should be carried out with respect to the captured imaged picture. Since the processing timing of the imaged picture is set so that the distant-view image is first processed and the down-view image is processed next to the distant-view image, the first captured image is used as a distant-view image to carry out the distant-view processing at and after step S31, and the next captured image is applied to carry out the down-view processing at and after step S33.

Figure 12:
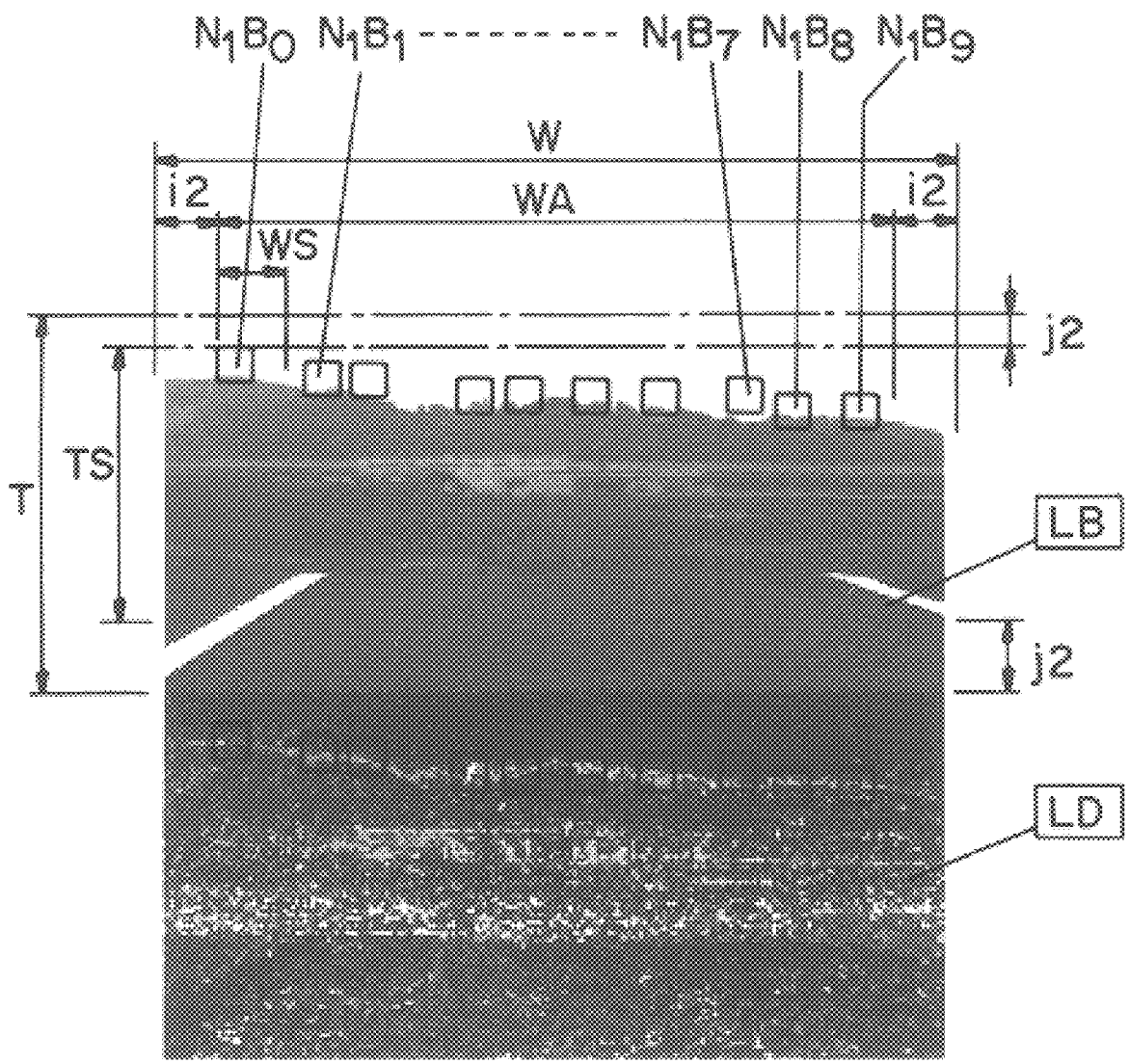
FIG. 12 is a schematic diagram for explaining a pattern for capturing distant-view No. 1 blocks.

First, in the distant-view processing at and after S31, the scanning range for searching the distant-view image for the No. 1 block is set as an initial processing at step S31. As shown in FIG. 12, assuming that the horizontal scanning direction of the imaging surface (LB denotes the distant-view original image and LD denotes the distant-view distance image) is W and the vertical scanning direction of T, the scanning range is set to be a range WA×TSL (WA=W−2·i2, TSL=T−2·j2) which is obtained by removing search margins i2 on both sides of the screen in the horizontal scanning direction and search margins j2 on both sides of the screen in the vertical scanning direction from the total region W×T.

The width WA in the horizontal scanning direction is equally divided into ten segments to set ten search areas WS×TSL, and one No. 1 block at the maximum is extracted every search area WS×TSL so as to prevent two or more No. 1 blocks from being extracted from the same search area to prevent the extracted portion from concentrating on a particular region on the imaging surface.

Then, at step S32, a pattern portion of 12×6 pixels is cut out of the search area WS×TSL, and the picture quality of the cut-out portion is evaluated to determine the No. 1 block. The picture quality of the pattern portion of 12×6 pixels is determined by a histogram, which is prepared by selecting the distance information of a region of 12×6 pixels in the corresponding distance image on the undermentioned conditions.

That is, the distance image value of 12×6 pixels is compared with a predetermined threshold. When the numeric value of each data is within an allowable range defined by the threshold, the data is regarded as an "OK information", and the frequency thereof is counted to prepare a histogram. When the numeric value of each data is beyond the allowable range, the data is regarded as an "NG information", and the frequency thereof is counted. The threshold value for selecting one of the "OK information" and the "NG information" determines a numeric value capable of recognizing a suitable distant-view image from the distance image data of 12×6 pixels.

In this case, it is preferably possible to capture a No. 1 block containing ridge lines, such as buildings and mountains, from the distant-view image for calculating the rotational speed. Therefore, the distant-view stereo cameras 12a and 12b are arranged so that a region for allowing a rapid scanning-line processing on the whole screen is arranged on the side of the heaven and a region for allowing a slow scanning-line processing is arranged on the side of the ground. Thus, the image containing ridge lines can be extracted as No. 1 blocks N1Bn (n=0, 1, . . . , 9) as shown in FIG. 12 by adjusting the percentage contents of the "OK information" and the "NG information".

Specifically, in order to calculate the component of rotational speed on the basis of the movement of the distant-view image, a region having a lot of distance image data, a small displacement amount (i.e., a long distance) and a small dispersion is used as a proposed No. 1 block to determine the threshold.

Figure 13:
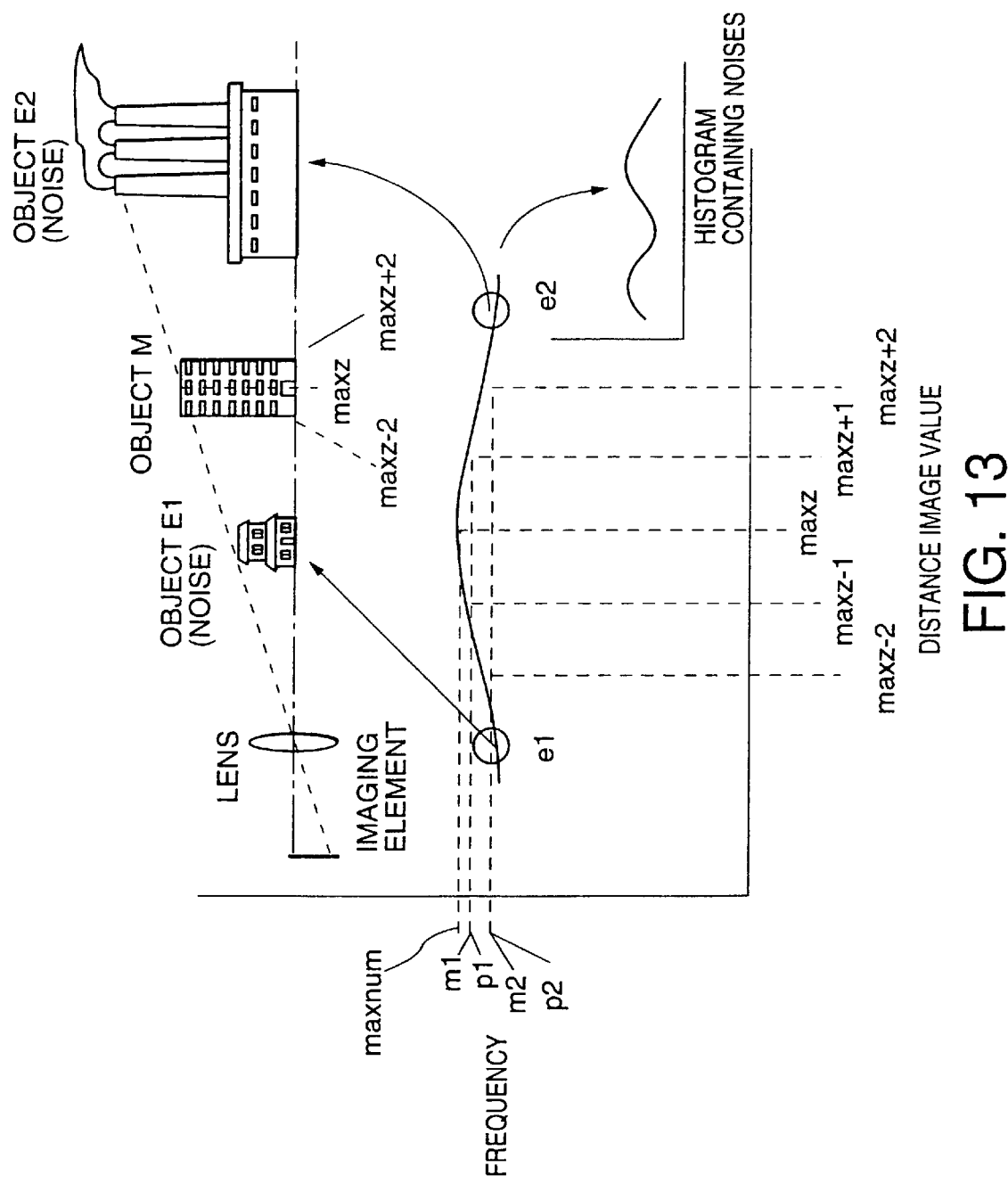
FIG. 13 is a schematic diagram for explaining an undesired example of a histogram distribution in an image evaluation.

That is, as shown in FIG. 13, if the distance information of the distance image region of 12×6 pixels is uneven, a No. 1 block to be determined is directed to a plurality of objects M, E1 and E2 having different perspectives, not to a certain portion (a single point), through the same window (a small region), so that the objects E1 and E2 appear at e1 and e2 in the histogram as noises.

Figure 14:
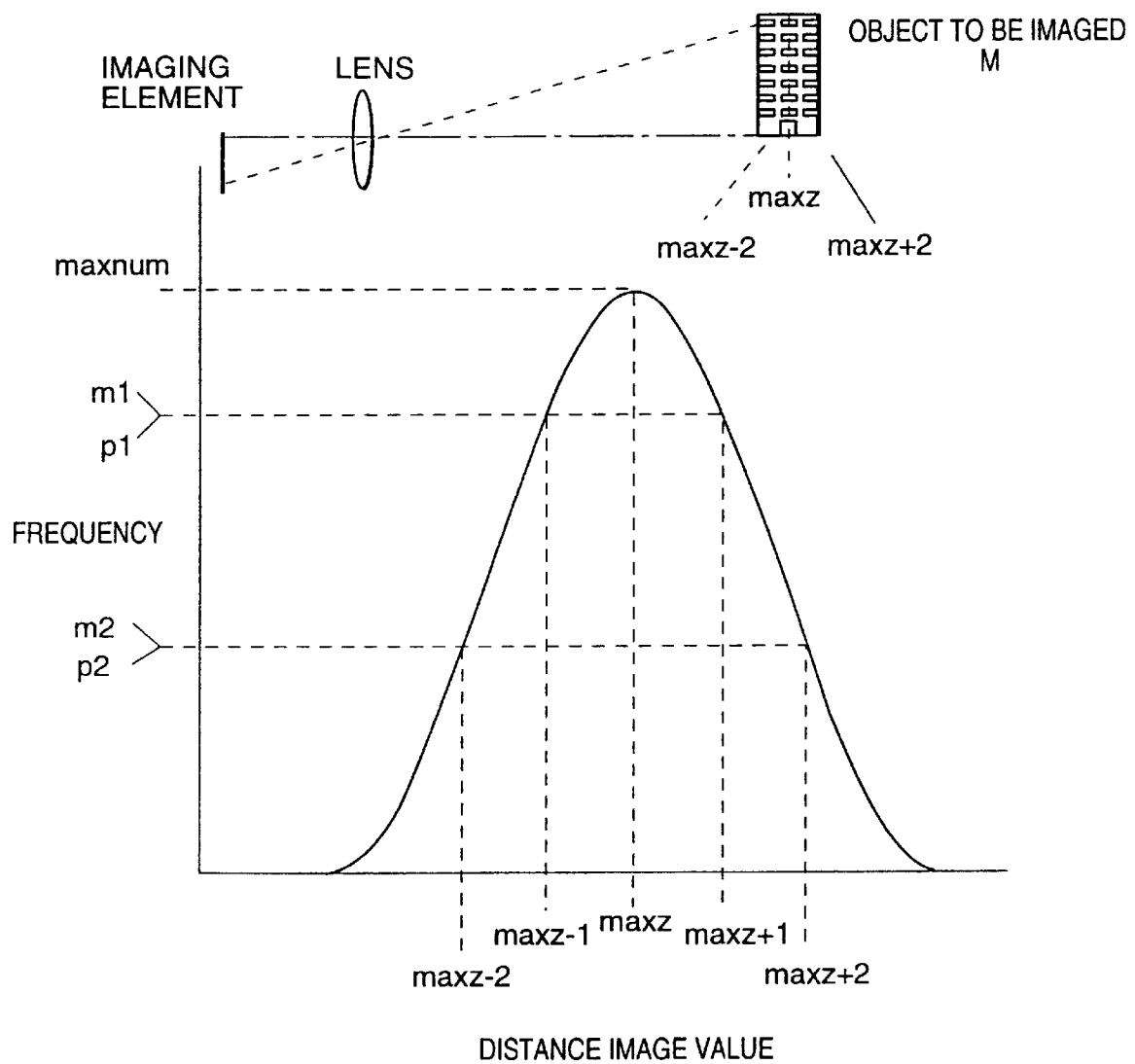
FIG. 14 is a schematic diagram for explaining a desired example of a histogram distribution in an image evaluation.

Therefore, the distance image value of 12×6 pixels is filtered by the threshold to remove noises, and the distance image value "maxz" having the maximum occurrence frequency and the maximum histogram value "maxnum" thereof are derived from the OK information to examine the occurrence frequency of other distance image values near the maximum histogram value "maxnum", so that the proposed object M in the used region can be determined as shown in FIG. 14.

In this preferred embodiment, the distance image values contained in the distance image region of 12×6 pixels and the respective histogram values are examined only within a range of maxz±2. The total frequency "dsum" of the occurrence frequency in the range of maxz±2 is calculated by the undermentioned formula (1). When the frequency of the "OK information" meets a predetermined number and when the total frequency "dsum" in the range of maxz±2 occupies the large part in the frequency of the "OK information" (e.g., 80% or more), it is determined that the cut-out pattern portion of 12×6 pixels is a reliable image as a No. 1 block.

$$Dsum = m2 + m1 + maxnum + p1 + p2 \tag{1}$$

wherein m2 is an occurrence frequency at maxz−2, m1 being an occurrence frequency at maxz−1, p1 being an occurrence frequency at maxz+1, and p2 being an occurrence frequency at maxz+2.

Then, when the pattern extraction of the No. 1 block is determined, an average distance image value "fz1" in the distance image region of 12×6 pixels is derived by the following formula (2) in order to accurately derive the distance value to the object required for the navigation calculation.

$$fz1 = zsum/dsum \tag{2}$$

wherein $zsum = (maxz-2) \cdot m2 + (maxz-1) \cdot m1 + maxz \cdot maxnum + (maxz\pm 1) \cdot p1 + (maxz+2) \cdot p2$.

The above described No. 1 block captuing with respect to the distant-view image is carried out every search area WS×TSL. When 10 No. 1 blocks at the maximum on the whole image are captured, the routine goes to the down-view processing at and after step S33. Furthermore, when an appropriate No. 1 block is not found in the search area WS×TSL, the extraction in the corresponding search area is stopped.

In the down-view processing, at step S33, the scanning range for seeking a No. 1 block is set as an initial processing for the down-view image. As shown in FIG. 15, the scanning range on the down-view image is a range WS×TA, with respect to 10 search areas WS×TSL of the distant-view image assuming that the vertical scanning direction is TA. The scanning range has a search starting line, which is a line Tt offset from a screen center line Th by a predetermined amount in the traveling direction. The width TA in the vertical scanning direction is divided into three parts to set 30 search areas WS×TSG so that a characteristic pattern dispersed on the whole screen can be extracted.

In this case, the offset line "Tt" can be changed by the translation speed obtained by the previous processing so that the imaging surface can be effectively utilized in accordance with the forward and reverse directions in view of the movement of the down-view image.

Then, at step S34, a pattern portion of 12×6 pixels is cut out of the search area WS×TSG, and the picture quality of the cut-out portion is evaluated to determine a No. 1 block. Although the determination of the No. 1 block in the down-view image is the same as the above described determination of the No. 1 block in the distant-view image, the threshold for selecting one of the "OK information" and the "NG information" is different from that for the distant-view image. That is, in order to calculate the components of translation speed on the basis of the movement of the down-view image, a plane region having a lot of distance image data and a small dispersion is used as a proposed No. 1 block to determine the threshold.

Then, at step S34, when 10 No. 1 blocks at the m in the horizontal scanning direction are captured, the routine goes to step S35 wherein it is examined whether the processing for all of the search areas in the down-view image has been completed. When the processing for all of the search areas has not been completed, the routine returns to step S34 wherein the processing for the search area, which is lower by one stage, is continued. Then, the loop including steps S34 and S35 is repeated three times to carry out the processing for 30 search areas.

Also in this case, when an appropriate No. 1 block is not found in the search area WS×TSG, the extraction in the corresponding search area is stopped. FIG. 15 shows an example of a down-view image wherein 25 No. 1 blocks N1B0, 1, 2, ..., 22, 23 and 24 are captured.

When the No. 1 block groups on the distant-view and down-view images are captured as described above, the routine goes to a process for seeking a No. 2 block having the same pattern as that of the No. 1 block. In order to ensure the quality of the navigation calculation, it is required to evaluate n No. 2 blocks, the number of which is the same as the number of the captured No. 1 blocks, to find No. 2 blocks as many as possible (n at the maximum). The n No. 1 blocks and the n No. 2 blocks are in pairs. The No. 1 blocks, which are not paired with the No. 2 blocks, are removed to obtain new No. 1 and No. 2 block groups.

Figure 8:
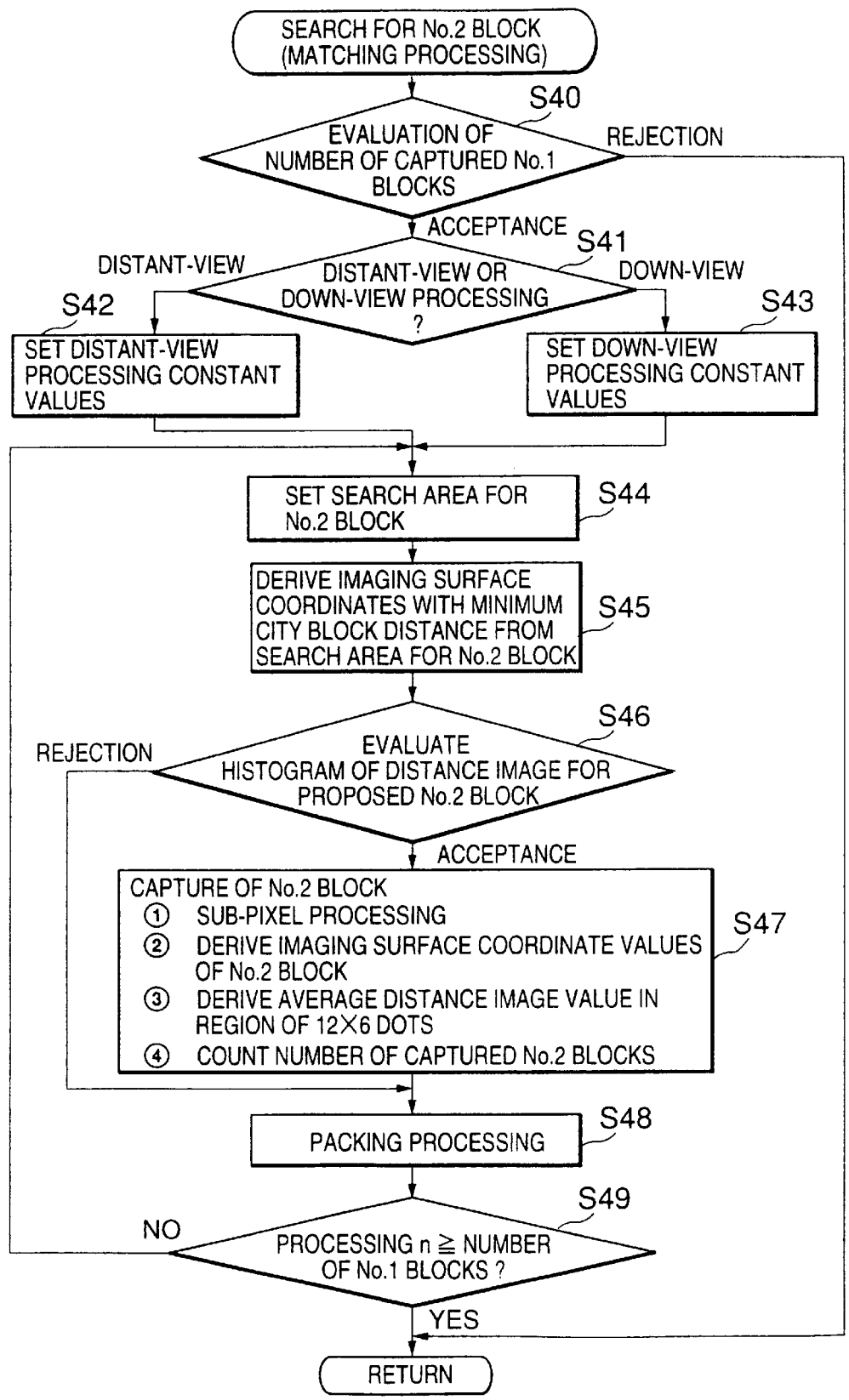
FIG. 8 is a flowchart of a processing routine for capturing No. 2 block group.

Referring to FIG. 8, a process for capturing a No. 2 block group will be described below. In this process, the number of the captured No. 1 blocks is evaluated at step S40. When the number of the captured No. 1 blocks does not reach a predetermined number, it is determined that the number of the captured No. 1 blocks should be rejected, and the routine ends. When the number of the captured No. 1 blocks reaches the predetermined number so that it is determined that the number of the captured No. 1 blocks is accepted, the routine goes to step S41 wherein it is determined whether the distant-view processing or the down-view processing should be carried out.

Then, when the processing for the distant-view image is carried out, the routine goes from step S41 to step S42 wherein distant-view processing constant values required to calculate distances, such as the focal lengths of the distant-view stereo cameras 12a and 12b, the distance between the two cameras, and the displacement amount (parallax) at infinity, are set, and the routine goes to step S44. When the processing for the down-view image is carried out, the routine goes from step S41 to step S43 wherein the down-view processing constant values required to calculate distances on the basis of the imaged pictures of the down-view stereo cameras 13a and 13b are set in the same manner, and the routine goes to step S44.

At step S44, a search area for a No. 2 block is set. The search area for a No. 2 block is set by predicting the location of the No. 1 block after a predetermined elapsed time without searching the whole imaged picture for the same pattern as that of the No. 1 block.

That is, when the No. 1 block is determined, the representative coordinates of the No. 1 block on the imaging surface are determined. Therefore, as shown in FIG. 16, four a points a, b, c and d offset from the center, which corresponds to the representative coordinates of the No. 1 block, by offset amounts (xf, yf) in the vertical and lateral directions are determined. Then, a rectangular region obtained by drawing lines between the four points a, b, c and d, i.e., a rectangular region (2·xf)×(2·yf), is regarded as a search area, wherein it is predicted that the same pattern as that of the No. 1 block exists on the basis of the imaging information when no movement exists on the screen, and this search area is arranged in view of the characteristics of the distant-view and down-view images.

Figure 17:
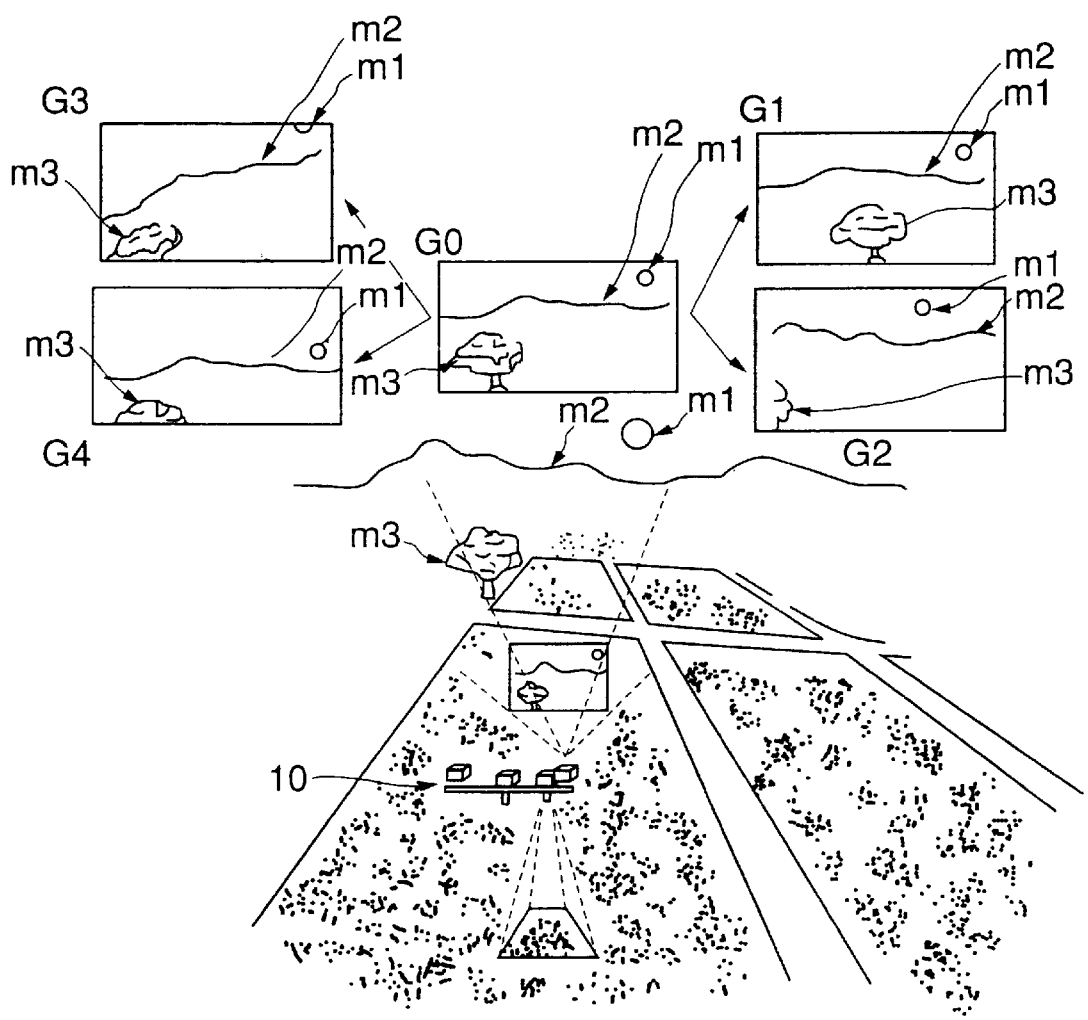
FIG. 17 is a schematic diagram for explaining the characteristics of a distant-view image.

In the case of the distant-view image as shown in FIG. 17, in a translation in a short time as shown in a screen G1, there are little variations in a distant cloud m1 and a mountain m2 and only a near clump of trees m3 moves in a lateral direction, with respect to a reference screen G0 having no rotation and translation. On the other hand, in a screen G2 wherein a yaw serving as a component of rotation occurs, the whole screen including the cloud m1, the mountain m2 and the clump of trees m3 moves in the lateral direction, so that a part of the clump of trees m3 is out of the field of view. In addition, in a screen G3 wherein a roll serving as a component of rotation occurs, the whole screen is inclined. Moreover, in a screen G4 wherein a pitch serving as a component of rotation occurs, the whole screen moves downwards.

That is, in the case of the distant-view image, since the ranging of a portion sufficiently far (e.g., 30 m or more) from the measured point is carried out, the distant-view image is difficult to vary due to the translation movement in the vertical and lateral directions in a short time, and the movement of the No. 1 block obtained by the distant-view image is regarded as the movement based on the component of rotation.

Figure 18:
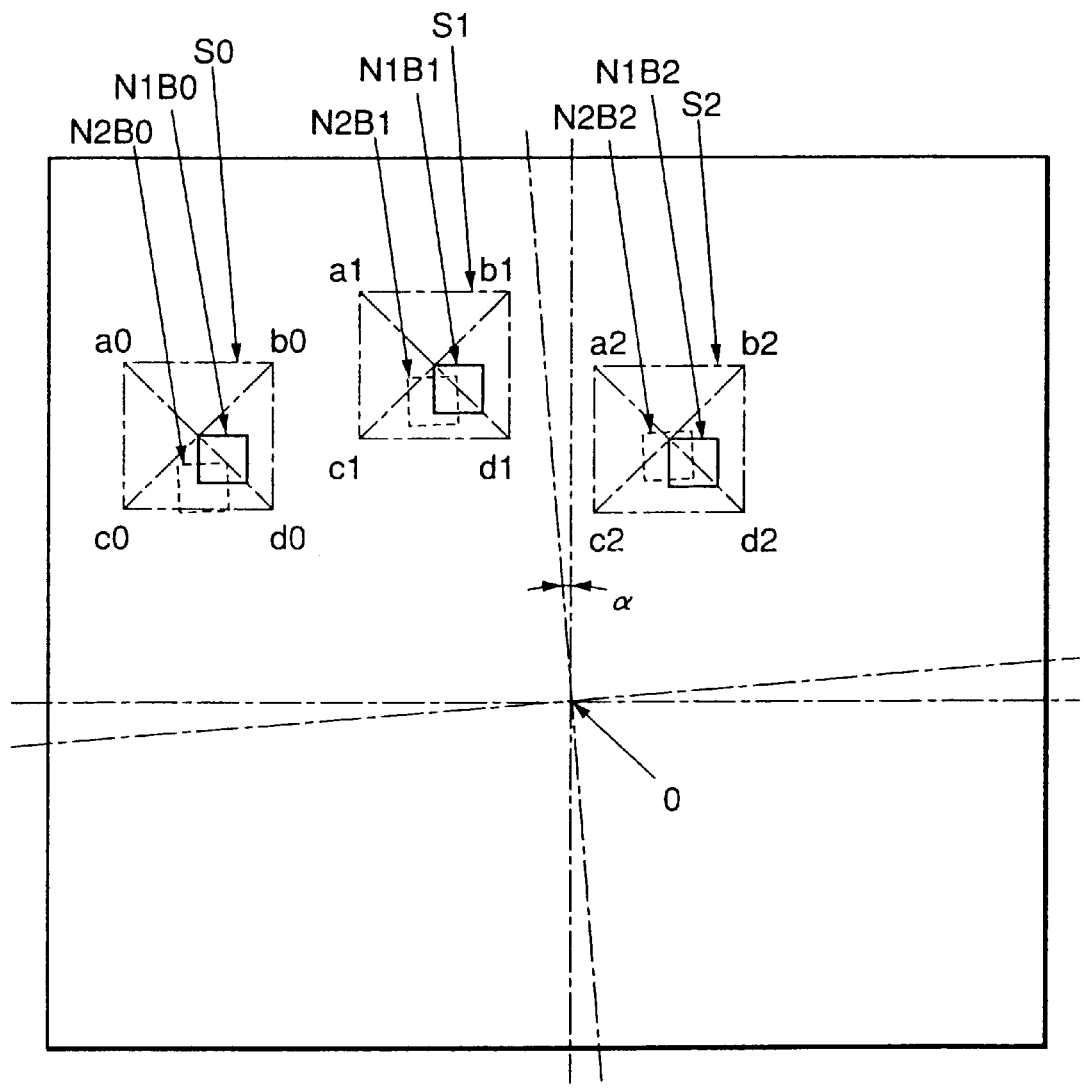
FIG. 18 is a schematic diagram for explaining an example of the setting of a search area on a distant-view image.

Therefore, in the distant-view image as shown in FIG. 18, the coordinate values of four points a, b, c and d in the search area are converted by an angle α of rotation about the origin O, and rectangular search areas S0. S1, S2, obtained by drawing lines between four points an, bn, cn, dn (n=0, 1, 2, . . . ) are set with respect to No. 1 blocks N1B0, N1B1, N1B2, Then, the processes at the subsequent steps are carried out to extract No. 2 blocks N2B0, N2B1, N2B2, from the respective search areas.

Figure 19A:
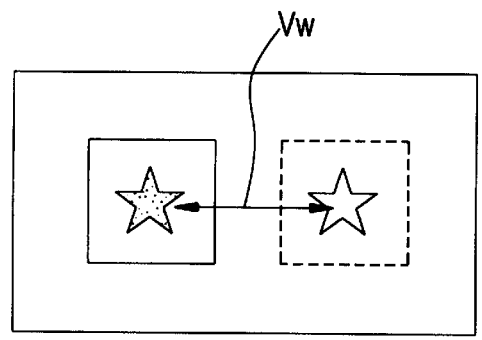
FIGS. 19a–19c are schematic diagrams for explaining the movement on a down-view imaging surface.
Figure 19B:
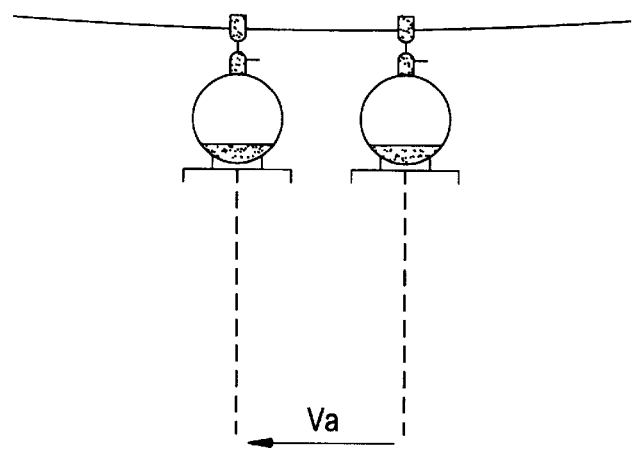
Figure 19C:
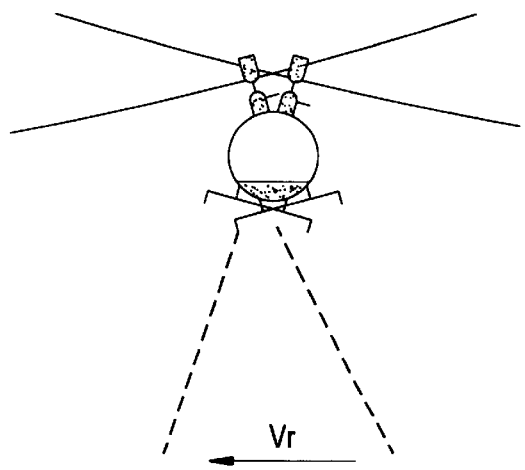

On the other hand, in the case of the down-view image as shown in FIG. 19, it is difficult to determine whether a movement amount Vw on the imaging surface is caused by the movement based on a component Va of translation or a component Vr of rotation. Therefore, the location of the No. 1 block after a predetermined elapsed time is predicted, and the search area for the No. 2 block at and after the next frame is set at the predicted position. That is, when the processing speed is sufficient high with respect to the movement of the helicopter or when the actual imaging range is wide, the movement of the image for each screen is not large, so that the search area may be set so as to correspond to the maximum variation per unit time. On the other hand, when the helicopter moves largely, the movement is predicted by assuming that the processing speed and the imaging range are insufficient, and the search area is set in view of the past component of velocity.

Figure 20:
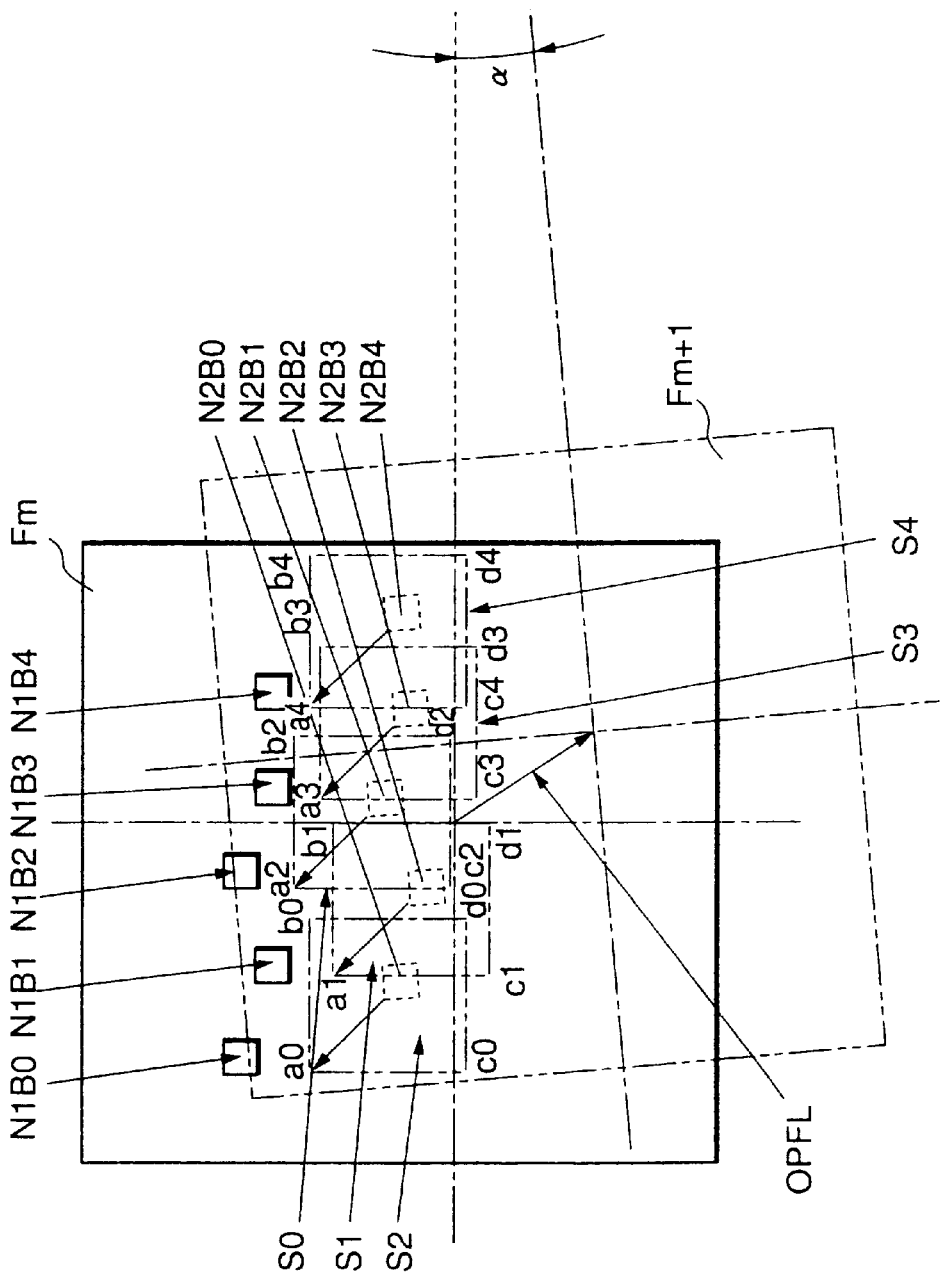
FIG. 20 is a schematic diagram for explaining an example of the setting of a search area on a down-view image.

In order to predict the location of the No. 1 block after the predetermined elapsed time, the position of the No. 1 block to be moved after the predetermined elapsed time is converted into the movement (a virtual optical flow) of the imaging surface coordinates on the basis of the components of roll, pitch and yaw obtained by the previous calculation of angular velocity and on the basis of the pure translation amount obtained by the previous calculation of translation speed. Then, as shown in FIG. 20, on the basis of a virtual optical flow OPFL between a frame Fm wherein the No. 1 blocks N1B0, N1B1, N1B2, N1B3, N1B4, . . . are determined and an object frame FM+1 wherein No. 2 blocks N2B0, N2B1, N2B2, N2B3, N2B4, . . . are to be found, search areas S0, S1, S2, S3, S4, . . . for the No. 2 blocks are set on the frame Fm+1.

When the search areas for the No. 2 blocks are set as described above, the routine goes from step S44 to step S45, wherein the luminance of the original image is extracted from the search area of the No. 2 block having the same shape as the No. 1 block every a minimum unit (every one pixel), and absolute values of the differences between the obtained luminance and the luminance of the corresponding pixel of the No. 1 block are derived to be summed up (a city block distance). Then, a region having a minimum city block distance is selected from the search area as a proposed No. 2 block, and the corresponding imaging surface coordinates are obtained. Then, the routine goes to step S46.

At step S46, with respect to the proposed location of the No. 2 block, the reliability of the original image of the No. 2 block is evaluated by the filter processing and the histogram processing similar to the evaluation for the No. 1 block. When the reliability is accepted, the process for capturing the No. 2 block is carried out at step S47. When the reliability is rejected, the corresponding data are abandoned, and the routine jumps to step S48.

In the process for capturing the No. 2 block at step S47, if necessary, the sub-pixel processing is carried out to derive sub-pixel values (values less than or equal to one pixel), and the imaging surface coordinate values of the No. 2 block containing the derived sub-pixel values are calculated. Then, an average distance image value fz2 of a distance image region of 12×6 pixels of the No. 2 block is derived, and the number of the captured No. 2 blocks is recorded. Then, the routine goes to step S48.

At step S48, the numbers of the finally captured No. 1 and No. 2 blocks are updated, and the data of the No. 1 and No. 2 block groups are compressed to be ranked by the packing processing. Then, it is examined at step S49 whether the number of the processes for capturing the No. 2 blocks reaches the number of the processes for capturing the No. 1 blocks. When the number of the processes for capturing the No. 2 blocks is smaller than the number of the processes for capturing the No. 1 blocks, the routine returns to step S44. When the number of the processes for capturing the No. 2 blocks reaches the number of the processes for capturing the No. 1 blocks, the routine ends.

Figure 9:
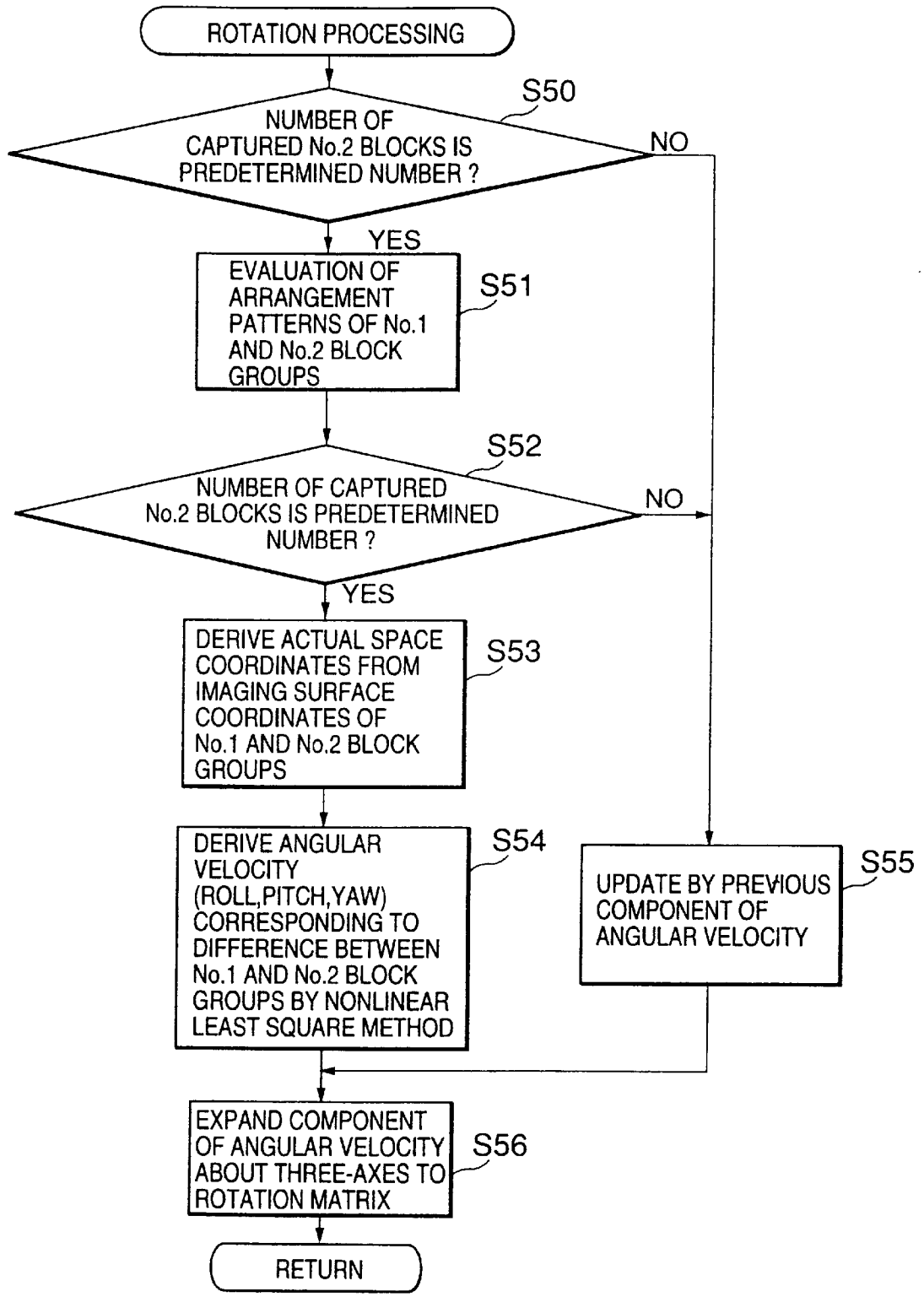
FIG. 9 is a flowchart of a rotation processing routine.

Referring now to FIG. 9, a process for calculating a component of rotational speed on the basis of the movement of the distant-view image will be described below. In the rotation processing routine of FIG. 9, it is determined at step S50 whether the No. 2 block group containing a predetermined number of samples required to maintain the calculation accuracy has been captured. When the predetermined number of samples have not been captured, the previously calculated result of the component of angular velocity is updated as the presently processed value to be stored in the memory, and the routine goes to step S56.

On the other hand, when the No. 2 block group containing the predetermined number of samples required to maintain the calculation accuracy has been captured, the routine goes from step S50 to step S51, wherein the arrangement pattern of the No. 1 block group is compared to the arrangement pattern of the No. 2 block group to evaluate the reliability of the optical flow.

That is, in the ideal movement of the image from the No. 1 block to the No. 2 based on the component of rotational speed, the relative positional relationship between the respective blocks (the arrangement pattern) scarcely varies due to the characteristics of the distant-view image. Therefore, the arrangement pattern of the No. 1 block group is compared to that of the No. 2 block group, and when the arrangements of the respective blocks are clearly different from each other, the corresponding blocks of both of the No. 1 and No. 2 block groups are removed.

The evaluation of the arrangement pattern is carried out by comparing the distance between the respective blocks of the No. 1 block group and the area of a triangle formed by the respective blocks to those of the No. 2 block group. For example, in order to evaluate whether a block A is selected so as to he positioned at a correct position in the No. 2 block group, the distance (A1–B1) between the block A and another block B in the No. 1 block group is first compared to the distance (A2–B2) between the block ABC and the block B in the No. 2 block group, and the distances between the blocks A and C and between the blocks A and D are also compared in the same manner.

If the distances between the blocks of the No. 1 and No. 2 block groups are equal to each other with respect to all of the three distances, the check on distance is OK. If they are not so, the blocks to be compared are sequentially changed to the next blocks E, G, . . . When the distances between the blocks are OK with respect to the three distances, the check on distance is OK, and when the distances between the blocks are NG with respect to the three distances, the check on distance is NG.

Thus, when the check on distances between the block A and three points (B, C, D) is OK, the area of a triangle ABC formed by the representative coordinates of the blocks A, B and C is derived with respect to the No. 1 and No. 2 block groups, and the sizes of the triangles ABC in the No. 1 and No. 2 block groups are compared to each other. This comparison is also carried out with respect to a triangle ACD. If the areas of the triangles ACD in the No. 1 and No. 2 block groups are equal to each other, it is finally determined that the position of the block A has been correctly selected in the No. 2 block group.

In this case, the check on distance is carried out by comparing the square values of the distances in accordance with Pythagoras' theorem, and the check on area of the triangle is carried out by calculating vector products and comparing the doubled values of the areas of the triangles (the areas of parallelograms), so that the calculation efficiency is improved.

After the improper blocks are removed by the above described evaluation of the arrangement pattern, the routine goes to step S52, wherein it is examined whether the number of No. 2 blocks is a predetermined number after removing the improper blocks. When the number of No. 2 blocks does not reach the predetermined number, the routine goes from step S52 to step S56 via step S55. When the number of No. 2 blocks reaches the predetermined number, the routine goes from step S52 to step S53.

Figure 21:
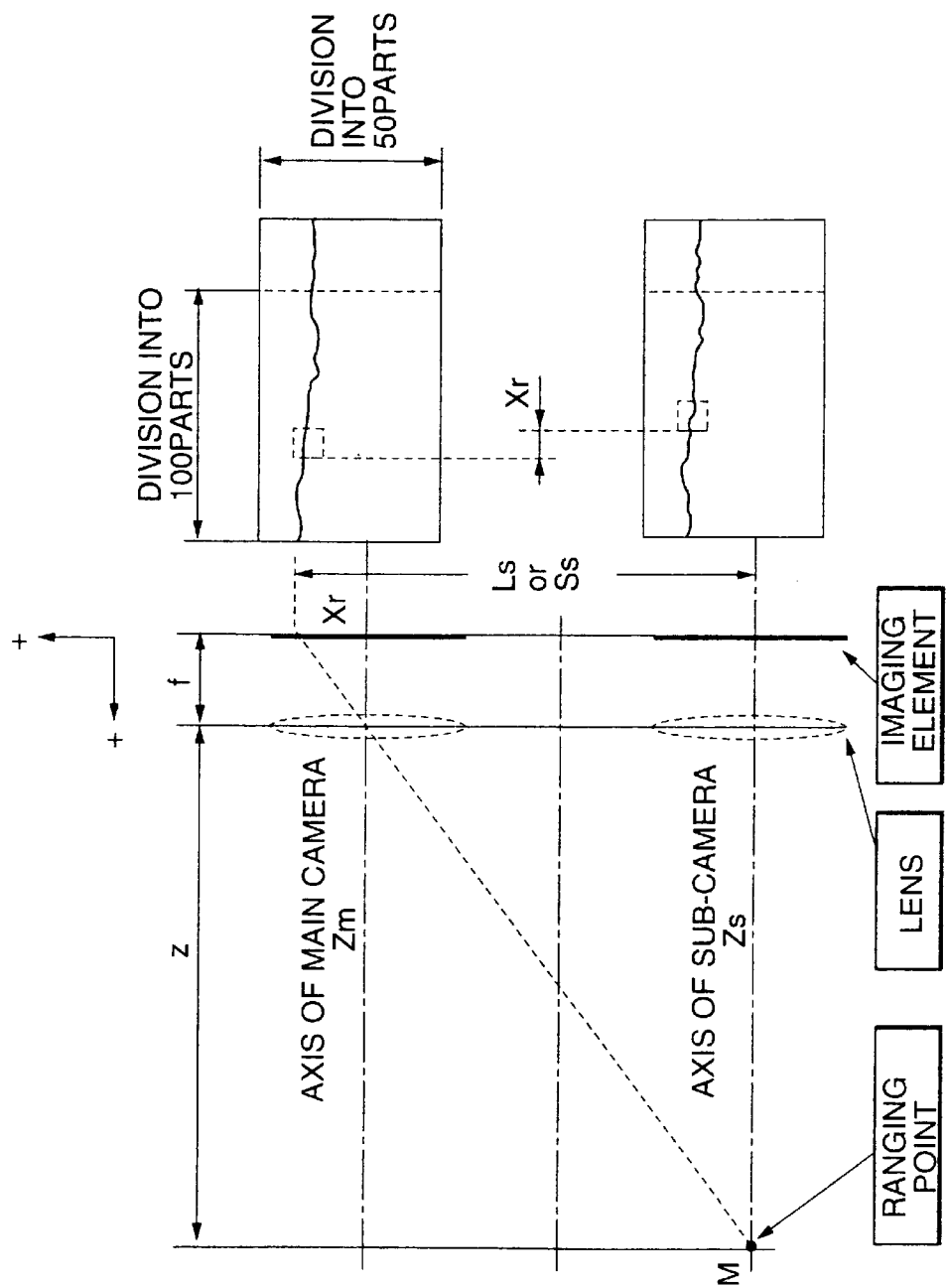
FIG. 21 is a schematic diagram for explaining the conversion of imaging surface coordinates to an actual distance a using the triangulation.

At step S53, the imaging surface coordinates of the No. 2 block is returned to actual space coordinates which are the X, Y and Z orthogonal coordinates fixed to the cameras. As shown in FIG. 21, assuming that the focal length of the lens is f, the base length between the axis Zm of the main camera and the axis Zs of the sub-camera is Ls (Ss) and the displacement amount of the stereo image is Xr, the distance Z to the ranging object point M is derived by the triangulation in accordance with the following formula (3), so that the imaging surface coordinates are converted to the actual space coordinates on the basis of the above relationship.

$$Z = Ls\ (Ss) \cdot f / Xr \qquad (3)$$

At subsequent step S54, an angular velocity (roll, pitch, yaw) corresponding to a difference between the positions of the No. 1 and No. 2 block groups is derived by the nonlinear least square method. That is, the movement on the imaging surface is converted using the previous components of rotation and translation as initial values to derive a difference between the positions of the No. 1 and No. 2 blocks. Moreover, the linear approximation of the difference is carried out, and the partial differential of the linear-approximated difference is carried out every component of rotation about three axes (X, Y, Z axes). Then, an appropriate deflection angle is added thereto to derive variations (dx, dy) in the difference between the positions of the No. 1 and No. 2 blocks on the imaging element for each of roll, pitch and yaw. The respective components of roll, pitch and yaw are obtained as the limits of the variations (dx, dy).

Therefore, the process for deriving the variations (dx, dy) are carried out with respect to all of the No. 1 and No. 2 blocks, and the components of rotation are obtained by the least square method. In this least square method, a three-elements linear equation is solved. However, since the transposed matrices with respect to coefficient matrices are equal to each other and since the diagonal elements are sufficiently larger than other elements (the positive constant value symmetry), the numerical calculation based on the Cholesky method can be applied to derive the respective values of roll, pitch and yaw with respect to the No. 1 blocks.

In fact, the solution derived by the above method is not a true value due to the non-linearity. Therefore, the solution approaches the true value by the nonlinear least square method, which uses the obtained value as an initial value to repeat the least square method. However, when the true value is derived, it is required to monitor and determine the convergence states (ideally 0) of the variations (dx, dy). That is, in order to obtain the components of angular velocity within the limited range with moderate accuracy, the number of repeated calculations can be limited to a predetermined number of times (e.g., five times) to decrease the time required to the processing.

After the component of angular velocity in the system of XYZ orthogonal coordinates fixed to the camera is derived in the processing at step S54, the routine goes to step S56, wherein the roll component r1, the pitch component pt and the yaw component yw are expanded to elements of a rotation matrix Rot to end the routine. This rotation matrix Rot is a product of a rotation matrix for each of the axes of roll, pitch and yaw. For example, as expressed by the following formulae (4) through (12), the rotation matrix R can be expanded as elements of a 3×3 square matrix.

$$Rot\ [0][0] = (cy \cdot cr) - (sy \cdot ans) \qquad (4)$$

$$Rot\ [1][0] = -(cp \cdot sr) \qquad (5)$$

$$Rot\ [2][0] = (sy \cdot cr) + (cy \cdot ans) \qquad (6)$$

$$Rot\ [0][1] = (cy \cdot cr) + (sy \cdot ans') \qquad (7)$$

$$Rot\ [1][1] = (cp \cdot cr) \qquad (8)$$

$$Rot\ [2][1] = (sy \cdot sr) - (cy \cdot ans') \qquad (9)$$

$$Rot\ [0][0] = -(sy \cdot cp) \qquad (10)$$

$$Rot\ [1][2] = sp \qquad (11)$$

$$Rot\ [2][2] = (cy \cdot cp) \qquad (12)$$

wherein cy=cos(yw) cr=cos(r1)

cp=cos(pt) sy=sin(yw)

sr=sin(r1) sp=sin(pt)

ans=sp·sr ans'=sp·cr

Figure 10:
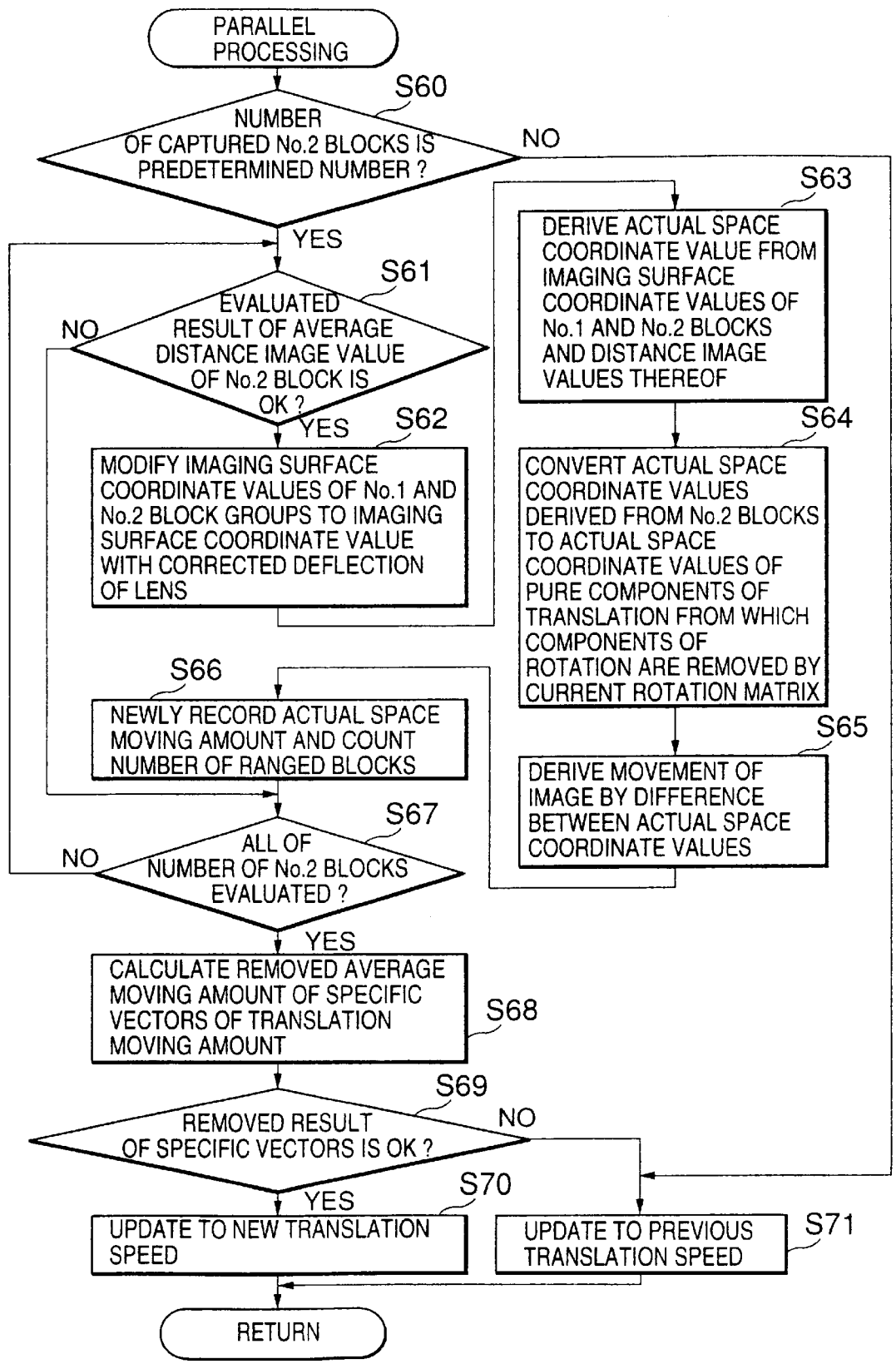
FIG. 10 is a flowchart of a translation processing routine.

Referring now to FIG. 10, a process for deriving a pure component of translation speed on the basis of the movement of the down-view image containing components of rotational and translation speeds will be described below.

In the translation processing routine of FIG. 10, it is examined at step S60 whether the No. 2 block group containing a predetermined number of samples required to maintain the calculation accuracy has been captured. When the No. 2 block group containing the predetermined number of samples has been captured, the routine goes from step S60 to step S61. When the No. 2 block group containing the predetermined number of samples has not been captured, the routine goes from step S60 to step S71 wherein the previously calculated result of the component of translation speed is updated as the presently processed value to be stored in the memory, and the routine ends.

At step S61, the average distance image value of the No. 2 block is evaluated. This evaluation is carried out to remove blocks having a larger difference between the distance image values of the No. 1 and No. 2 blocks than a threshold value of those blocks. When there are such blocks, the routine jumps to step 67, wherein it is examined whether all of the blocks of the No. 2 block group other than the blocks to be removed have been evaluated. By the loop returning from step S67 to step S61, blocks having a larger difference between the distance image values than the threshold value are removed from the whole No. 1 and No. 2 block groups.

Thereafter, the average distance image value of the No. 2 blocks is evaluated at step S61, and the routine goes to step S62. At step S62, the respective samples of the No. 1 and No. 2 block groups are modified to imaging surface coordinate values having a corrected deflection of lens to be updated to new No. 1 and No. 2 block groups having small dispersion in ranging accuracy. Furthermore, when the number of blocks removed in the loop between steps S61 and S67 is large so that the number of samples required to maintain the calculation accuracy can not be obtained, the previously calculated result of the component of translation speed is used as the presently processed value to end the translation processing.

At subsequent step S63, coordinate (the XYZ orthogonal coordinate fixed to the camera) values in the actual space are derived on the basis of the imaging surface coordinate values of the No. 1 and No. 2 blocks and the distance image values thereof. Then, at step S64, the actual space coordinate values derived from the No. 2 blocks are converted to the actual space coordinate values of the pure components of translation, from which the components of rotation are removed by the current rotation matrix, and the routine goes to step S65, wherein the movement of the image (the moving vector) is derived by the difference between the actual space coordinate values.

That is, since the imaging surface of the distant-view image is perpendicular to the imaging surface of the down-view image, the moving vector amount between the No. 1 and No. 2 blocks, which includes rotational and translation movements, is multiplied (relatively rotated) by the previously derived rotation matrix Rot (the rotation matrix from the No. 2 block to the No. 1 block), so that the movement of the component of rotation can be removed by the actual distance class.

Then, the routine goes to step S66 wherein the actual space moving amount is newly recorded and the number of ranged blocks is counted. Then, at step S67, it is examined whether all the blocks of the No. 2 block group have been evaluated. Then, when the evaluation of all the blocks of the No. 2 block group has not been completed, the routine returns to step S61, and when the evaluation of all the blocks of the No. 2 block group has been completed, the routine goes to step S68. At step S68, the filtering process for removing the moving vectors (specific vectors), which have abnormal direction and size, is carried out with respect to the whole optical flow by a statistical processing, such as interval estimation, to calculate an average moving amount after removing the specific vectors.

Thereafter, at step S69, the removed results of the specific vectors are examined. When the number of the specific vectors is too large to obtain the number of data required to maintain the accuracy of the navigation calculation, the memory value is updated at step S71 so that the previously calculated result of the component of translation speed is replaced with the presently processed value, and the routine ends. On the other hand, when there is little specific vector or when the number of the specific vectors has no influence on the deterioration of the accuracy of the navigation calculation, the routine goes from step S69 to step S70 wherein a three-dimensional translation speed |S| of a component (X1, Y1, Z1) is derived to update the memory value by this new translation speed, and the routine ends.

Figure 11:
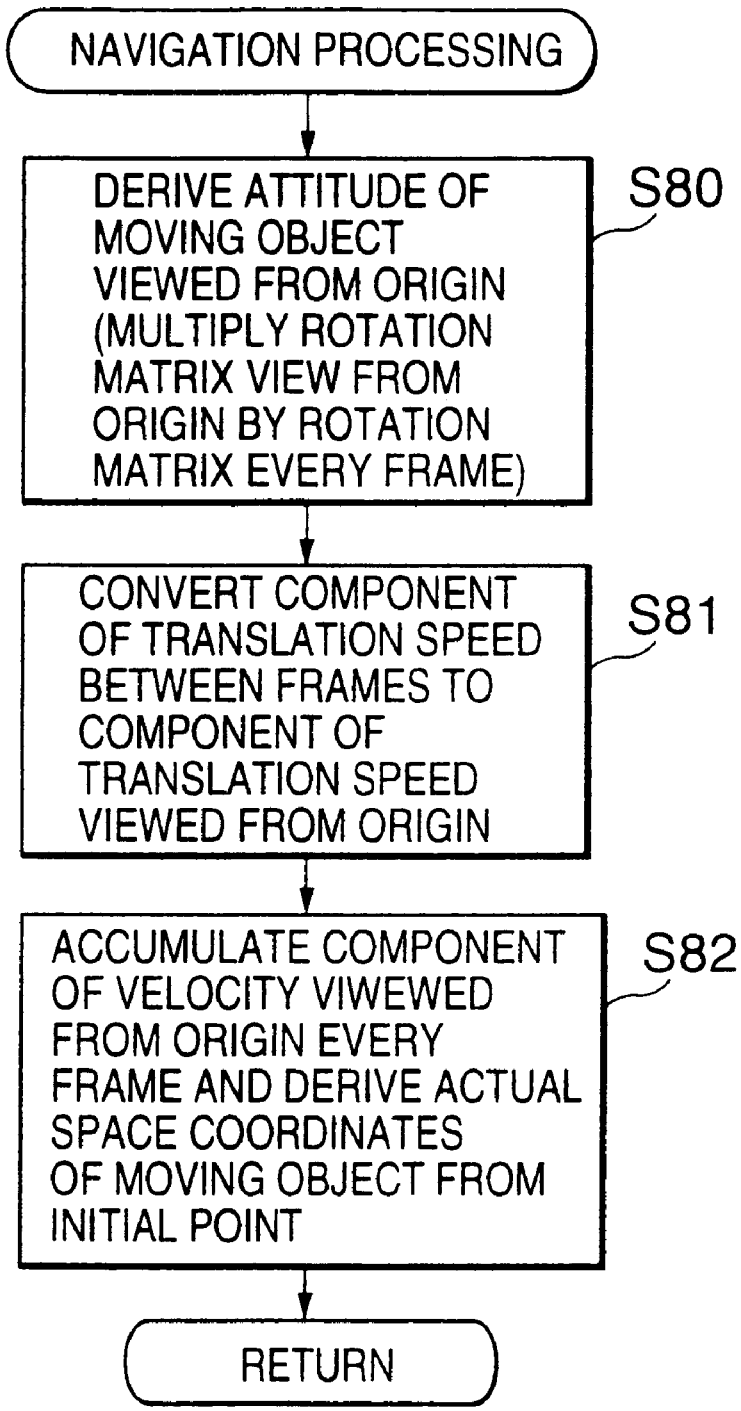
FIG. 11 is a flowchart of a navigation processing routine.

After the above described translation processing, a navigation processing of FIG. 11 for deriving a navigation locus is executed. In this navigation processing, the attitude of the moving object viewed from the origin (the ranging starting point) is first derived at step S80. The attitude of the moving object viewed from the origin is indicated by a rotation matrix Rots viewed from a system of XYZ orthogonal coordinates fixed to a space at the ranging starting point. Therefore, the rotation matrix is converted to a unit matrix at the ranging starting point to be initialized so that a plane perpendicular to the imaging surface is a reference surface indicating the actual space, and this matrix at the initializing time is multiplied, from the right, by the rotation matrix (the rotation matrix viewed from the system of XYZ orthogonal coordinates fixed to the camera) Rot between the frames, so that the matrix thus derived is regarded as the rotation matrix Rots representative of the attitude of the moving object viewed from the origin.

That is, the rotation matrix Rots representative of the attitude viewed from the origin is a square matrix obtained by multiplying, in time series, the rotation matrix Rot for each frame viewed from the system of coordinates fixed to the camera. As expressed by the following formula (13), the rotation matrix Rots representative of the attitude viewed from the origin in the current processing can be obtained by updating the rotation matrix Rots representative of the attitude viewed from the origin, by a square matrix, which is obtained by multiplying, from the right, the last rotation matrix Rots representative of the attitude viewed from the origin by the rotation matrix Rot between frames obtained by the current rotation processing. Thus, the current attitude of the moving object viewed from the origin can be indicated.

$$Rots = Rots \cdot Rot \quad (13)$$

Furthermore, components of angular velocity Roll, Pitch and Yaw viewed from the origin can be derived by the following formulae (14) through (16) using the above rotation matrix Rots.

$$Roll = atan\ (Rots\ [0][1]/Rots\ [0][0]) \quad (14)$$

$$Pitch = atan\ (Rots\ [1][2]/Rots\ [2][2]) \quad (15)$$

$$Yaw = atan\ (Rots\ [2][0]/Rots\ [2][2]) \quad (16)$$

Then, the routine goes to step S81, wherein the component of translation speed between frames is converted to a component of translation speed viewed from the origin. Then, at step S82, the component of velocity viewed from the origin is accumulated every frame to derive actual space coordinates of the moving object from the initial point.

A translation speed So viewed from the origin can be derived by accumulating a product, which is obtained by multiplying the rotation matrix Rots representative of the attitude viewed from the origin by a three-dimensional translation speed S between frames, on the last translation speed So viewed from the origin, as expressed by the following formula (17). In addition, the navigation locus shown in FIG. 23 can be obtained by multiplying the accumulated vector quantity by a predetermined distance conversion value, so that the moving amount of the moving object from the origin can be recognized.

$$So = So + (Rots) \cdot S \quad (17)$$

Figure 22:
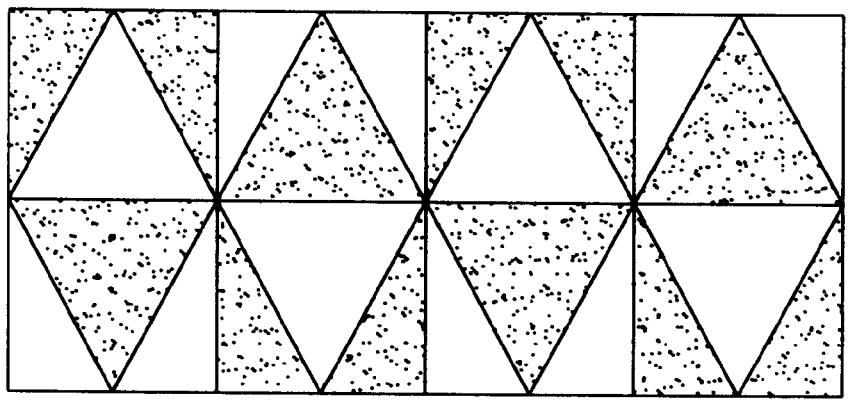
FIG. 22 is a schematic diagram showing a landmark of a ranging starting point.

In this case, a landmark shown in FIG. 22 is provided on the ground at a suitable point to be recognized by the pattern recognition or the like, and the origin is initialized as the ranging starting point, so that the moving-object's own relative position can be recognized by the above described navigation locus.

Moreover, if a suitable point on the ground is initialized as the origin by a positioning information obtained by a satellite positioning system, such as GPS, or a known map information, the moving-object's own absolute position from the navigation locus can be recognized.

As described above, it is possible to precisely recognize the distance to the object to be imaged to carry out very accurate survey, and it is possible to obtain a precise terrain clearance even if a flying object flies at a low altitude above a complex topography. That is, it is possible to achieve a precise autonomous navigation function having smaller drift than those of conventional systems, and it is possible to cause the surrounding environment analysis using images having a massive amount of information to be reflected on the navigation processing.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A position recognizing system of an autonomous running vehicle, comprising:

imaging means for imaging a distant landscape and a downward landscape every a predetermined period of time by an imaging system mounted on said autonomous running vehicle;

first capturing means for extracting a plurality of characteristic pattern regions serving as first blocks from a first frame of an imaged picture of each of said distant landscape and said downward landscape;

second capturing means for searching a second frame of an imaged picture of each of said distant landscape and said downward landscape for regions serving as second blocks having a same pattern as that of said first blocks, said second frame being imaged at the next timing to said first frame;

rotational processing means for deriving a component of rotational speed of said autonomous running vehicle between said first and second frames on the basis of a movement of said imaged picture of said distant landscape from said first blocks to said second blocks and on the basis of an elapsed time between said first and second frames;

translation processing means for deriving a component of velocity of said autonomous running vehicle between said first and second frames on the basis of a movement of said imaged picture of said downward landscape from said first blocks to said second blocks and on the basis of an elapsed time between said first and second frames and for removing said component of rotational speed from said component of velocity to derive a component of translation speed of said autonomous running vehicle between said first and second frames; and navigation processing means for converting said component of translation speed between said first and second frames to a component of translation speed viewed from a ranging starting point and for accumulating the converted component of translation speed to derive a navigation locus in a three-dimensional space so as to accurately perform an autonomous navigation by processing a huge amount of image data at a fast speed without drifting.

2. The position recognizing system of an autonomous running vehicle according to claim 1, wherein said imaging system is a stereo imaging system, and each of said rotational processing means and said translation processing means derives said movement of said imaged picture as a moving amount in actual space coordinates, which are obtained by converting imaging surface coordinates to actual distances on the basis of distance image corresponding to each of said distant landscape and said downward landscape by said stereo imaging system.

3. The position recognizing system of an autonomous running vehicle according to claim 2, wherein said first capturing means extracts a small region in said imaged picture of said distant landscape as a proposed first block, which has a small in distance image value in a region corresponding to said distance image and which is sufficiently far from a ranging point.

4. The position recognizing system of an autonomous running vehicle according to claim 2, wherein said first capturing means extracts a small plane region in said imaged picture of said downward landscape as a proposed first block, which has a small dispersion in distance image value in a region corresponding to said distance image.

5. The position recognizing system of an autonomous running vehicle according to claim 2, wherein said first capturing means extracts said first blocks, evaluating a picture quality of an objective region by a histogram prepared using a distance image value of a corresponding region of said distance image.

6. The position recognizing system of an autonomous running vehicle according to claim 5, wherein said first capturing means prepares said histogram by counting a frequency larger than or equal to a predetermined threshold every extracting pixel.

7. The position recognizing system of an autonomous running vehicle according to claim 5, wherein said first capturing means evaluates said picture quality of said objective region, by determining whether a proportion of a total frequency of histogram values in a predetermined range to a distance image value recording the maximum histogram is higher than or equal to a predetermined proportion.

8. The position recognizing system of an autonomous running vehicle according to claim 2, wherein said second capturing means extracts a region having a minimum city block distance between a predetermined search area surrounding each of said first blocks and each of said first blocks, as a proposed second block.

9. The position recognizing system of an autonomous running vehicle according to claim 2, wherein said second capturing means extracts a region having a minimum city block distance between a predetermined search area surrounding predicted imaging surface coordinates for each of said second blocks and each of said first blocks, as a proposed second block, and said predicted imaging surface coordinates are predicted as imaging surface coordinates of a new position of each of said first blocks on the next frame on the basis of the last component of rotational speed or translation speed.

10. The position recognizing system of an autonomous running vehicle according to claim 2, wherein said stereo imaging system comprises a distant landscape imaging stereo camera and a downward landscape imaging stereo camera, and imaging surfaces of said stereo cameras are perpendicular to each other.

11. The position recognizing system of an autonomous running vehicle according to claim 10, wherein said distant landscape imaging stereo camera and said downward landscape imaging stereo camera have a reference camera, respectively, and said reference cameras of said stereo cameras are arranged so that said reference cameras are adjacent to each other.

12. The position recognizing system of an autonomous running vehicle according to claim 1, wherein said navigation processing means converts said component of translation speed between said first and second frames to said component of translation speed viewed from said ranging starting point, correcting said component of translation speed between said first and second frames by a component of rotational speed representative of the current attitude of said autonomous running vehicle viewed from said ranging starting point.

13. The position recognizing system of an autonomous running vehicle according to claim 12, wherein said navigation processing means represents said current attitude of said autonomous running vehicle viewed from said ranging starting point as a matrix, which is derived by multiplying a matrix representative of the attitude of said autonomous running vehicle viewed from said ranging starting point until the last processing by a matrix representative of a component of rotational speed between the said first and second frames at the current processing, after a matrix representative of a component of rotational speed of said autonomous running vehicle at said ranging starting point is converted to a unit matrix to be initialized.

14. The position recognizing system of an autonomous running vehicle according to claim 1, wherein said first capturing means extracts said first blocks from a plurality of search areas, which are obtained by diving said imaged picture by a predetermined range, so that a maximum of one of said first blocks is extracted every search area.

15. The position recognizing system of an autonomus running vehicle according to claim 1, wherein said first capturing means extracts m first blocks from n regions, which are obtained by dividing said imaged picture, so that the number of said first blocks extracted in each of said n regions is m/n at the maximum.

16. The position recognizing system of an autonomous running vehicle according to claim 1, wherein said first capturing means extracts said first blocks from said imaged picture of said downward landscape within a scanning range which has a search starting line offset from a center line of said imaged picture by a predetermined amount in a traveling direction, and said search starting line is variable by said component of translation speed.

17. The position recognizing system of an autonomous running vehicle according to claim 1, wherein said second capturing means extracts each of said second blocks from a predetermined search area surrounding each of said first blocks.

18. The position recognizing system of an autonomous running vehicle according to claim 1, wherein said second capturing means extracts each of said second blocks from a predetermined search area surrounding predicted imaging surface coordinates for each of said second blocks, and said predicted imaging surface coordinates are predicted as imaging surface coordinates of a new position of each of said first blocks on the next frame on the basis of the last component of rotational speed or translation speed.

19. The position recognizing system of an autonomous running vehicle according to claim 1, wherein said rotational processing means updates components of rotational speeds in the last processing as components of rotational speeds in the current processing, when said first capturing means and second capturing means do not capture predetermined pairs of said first and second blocks.

20. The position recognizing system of an autonomous running vehicle according to claim 1, wherein said translation processing means updates components of translation speeds in the last processing as components of translation speeds in the current processing, when said first capturing means and second capturing means do not capture predetermined pairs of said first and second blocks.

21. The position recognizing system of an autonomous running vehicle according to claim 1, wherein said first capturing means examines a difference between an arrangement pattern of said first blocks and an arrangement pattern of said second blocks to remove blocks having different arrangement.

22. The position recognizing system of an autonomous running vehicle according to claim 21, wherein said first capturing means examines said difference between said arrangement patterns by a distance between the respective blocks and an area of a triangle formed by the respective blocks.

23. The position recognizing system of an autonomous running vehicle according to claim 1, wherein said second capturing means examines a difference between an arrangement pattern of said first blocks and an arrangement pattern of said second blocks to remove blocks having different arrangement.

24. The position recognizing system of an autonomous running vehicle according to claim 23, wherein said second capturing means examines said difference between said arrangement patterns by a distance between the respective blocks and an area of a triangle formed by the respective blocks.

25. The position recognizing system of an autonomous running vehicle according to claim 1, wherein said navigation processing means initializes said ranging starting point by an information obtained by a positioning system or a known map information, and recognizes an absolute position of said autonomous running vehicle by said navigation locus.

* * * * *